(12) United States Patent
Shan et al.

(10) Patent No.: US 11,160,036 B2
(45) Date of Patent: Oct. 26, 2021

(54) SIGNAL SENDING METHOD, SIGNAL RECEIVING METHOD, RESOURCE DETERMINING METHOD, AND DEVICE

(71) Applicant: HUAWEI TECHNOLOGIES CO., LTD., Guangdong (CN)

(72) Inventors: Baokun Shan, Beijing (CN); Odile Rollinger, Cambridge (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/941,276

(22) Filed: Jul. 28, 2020

(65) Prior Publication Data

US 2020/0367179 A1  Nov. 19, 2020

Related U.S. Application Data

(63) Continuation of application No. PCT/CN2018/074838, filed on Jan. 31, 2018.

(51) Int. Cl.
*H04W 52/16* (2009.01)
*H04W 52/36* (2009.01)
*H04W 52/14* (2009.01)
*H04W 72/04* (2009.01)

(52) U.S. Cl.
CPC ....... *H04W 52/365* (2013.01); *H04W 52/146* (2013.01); *H04W 72/0406* (2013.01)

(58) Field of Classification Search
CPC ............. H04W 52/365; H04W 52/146; H04W 72/0406

(Continued)

(56) References Cited

U.S. PATENT DOCUMENTS 8,223,708 B2 * 7/2012 Guo .................. H04W 28/0278
 370/329
10,231,194 B2 * 3/2019 Zhou ..................... H04W 60/00
(Continued)

FOREIGN PATENT DOCUMENTS

CN   102104905 A   6/2011
CN   106031284 A   10/2016
(Continued)

OTHER PUBLICATIONS

Ericsson,"MAC aspects on DVI/BSR/PHR/etc for NB-IoT",3GPP TSG-RAN WG2 #93bis, Tdoc R2-162772,Dubrovnik, Croatia, Apr. 11-15, 2016, 5 pages.
(Continued)

*Primary Examiner* — Hai V Nguyen
(74) *Attorney, Agent, or Firm* — Fish & Richardson P.C.

(57) ABSTRACT

Example signal sending methods and apparatus are described. One example method includes generating a media access control (MAC) control element (CE) indicating a power headroom in a first power headroom set or a power headroom in a second power headroom set. If the MAC CE indicates the power headroom in the first power headroom set, the MAC CE includes a first bit field and a second bit field, where the first bit field is a reserved bit field, and the second bit field indicates the power headroom in the first power headroom set. If the MAC CE indicates the power headroom in the second power headroom set, the MAC CE includes a third bit field, where the third bit field is used to indicate the power headroom in the second power headroom set, and the third bit field includes a bit of the first bit field and a bit of the second bit field. The MAC CE is sent to a network device.

9 Claims, 11 Drawing Sheets

(58) Field of Classification Search
USPC .......................................................... 455/522
See application file for complete search history.

(56) References Cited

U.S. PATENT DOCUMENTS

| | | | |
|---|---|---|---|
| 10,440,774 B2* | 10/2019 | Dai | H04W 76/27 |
| 10,834,714 B2* | 11/2020 | Zhou | H04W 72/042 |
| 2009/0303954 A1* | 12/2009 | Guo | H04L 47/30 |
| | | | 370/329 |
| 2010/0093386 A1* | 4/2010 | Damnjanovic | H04W 74/002 |
| | | | 455/522 |
| 2013/0070716 A1* | 3/2013 | Kwon | H04L 5/001 |
| | | | 370/329 |
| 2013/0188570 A1* | 7/2013 | Zhao | H04L 5/001 |
| | | | 370/329 |
| 2017/0318606 A1* | 11/2017 | Lee | H04W 74/004 |
| 2017/0325205 A1* | 11/2017 | Zhou | H04W 72/12 |
| 2018/0206290 A1* | 7/2018 | Dai | H04W 52/50 |
| 2019/0141776 A1* | 5/2019 | Kim | H04W 76/20 |
| 2019/0373669 A1* | 12/2019 | Dai | H04W 74/0833 |
| 2020/0196355 A1* | 6/2020 | Zhao | H04W 74/08 |
| 2020/0359419 A1* | 11/2020 | Liberg | H04W 52/245 |
| 2020/0383119 A1* | 12/2020 | Sun | H04L 5/0092 |
| 2020/0403760 A1* | 12/2020 | Ratasuk | H04L 5/0005 |

FOREIGN PATENT DOCUMENTS

| | | |
|---|---|---|
| CN | 107046728 A | 8/2017 |
| CN | 107454620 A | 12/2017 |
| EP | 2627115 A1 | 8/2013 |
| EP | 2635082 A1 | 9/2013 |
| EP | 3240350 A1 | 11/2017 |
| JP | 2016521074 A | 7/2016 |
| WO | 2011159122 A2 | 12/2011 |
| WO | 2017133565 A1 | 8/2017 |

OTHER PUBLICATIONS

3GPP TS 36.321 V15.0.0 (Dec. 2017),3rd Generation Partnership Project,Technical Specification Group Radio Access Network,Evolved Universal Terrestrial Radio Access (E-UTRA),Medium Access Control (MAC) protocol specification (Release 15), 109 pages.

Samsung,"Baseline PHR format for NR",3GPP TSG-RAN WG2 Meeting #97bis, R2-1702978,Spokane, WA, USA, Apr. 3-7, 2017, 2 pages.

3GPP TS 36.331 V15.0.1 (Jan. 2018),3rd Generation Partnership Project,Technical Specification Group Radio Access Network,Evolved Universal Terrestrial Radio Access (E-UTRA),Radio Resource Control (RRC),Protocol specification (Release 15), 776 pages.

Ericsson,"[99bis#53][MTC/NB-IoT] EDT indication via PRACH",3GPP TSG-RAN WG2 #100,R2-1713057,Reno, Nevada, USA, Nov. 27-Dec. 1, 2017, 30 pages.

3GPP TS 36.213 V15.0.0 (Dec. 2017),3rd Generation Partnership Project,Technical Specification Group Radio Access Network,Evolved Universal Terrestrial Radio Access (E-UTRA),Physical layer procedures(Release 15), 493 pages.

PCT International Search Report and Written Opinion in International Application No. PCT/CN2018/074,838, dated Oct. 8, 2018, 21 pages (With English Translation).

Partial Supplementary European Search Report issued in European Application No. 18903551.2 dated Nov. 18, 2020, 14 pages.

Office Action issued in Chinese Application No. 201880087587.0 dated Mar. 29, 2021, 8 pages.

Ericsson, "Remaining general aspects of early data transmission," 3GPP TSG-RAN WG2 #100, R2-1713054, Reno, Nevada, USA, Nov. 27-Dec. 1, 2017, 7 pages.

ETSI TS 136 213 V9.0.1 (Jan. 2010), "LTE; Evolved Universal Terrestrial Radio Access (E-UTRA); Physical layer procedures (3GPP TS 36.213 version 9.0.1 Release 9)," Jan. 2010, 81 pages.

Extended European Search Report issued in European Application No. 18903551.2 dated Mar. 19, 2021, 18 pages.

Mediatek Inc., "On NB-IoT EDT indication vi a PRACH," 3GPP TSG RAN WG2 Meeting #100, R2-1713679, Reno, Nevada, USA, Nov. 27-Dec. 1, 2017, 5 pages.

Ericsson, "On the UL power control of NPRACH in NB-IoT [online]," 3GPP TSG RAN #76, RP-171218, West Palm Beach, US, Jun. 5-9, 2017, 6 pages.

Office Action issued in Japanese Application No. 2020-541715 dated Aug. 31, 2021, 10 pages (with English translation).

* cited by examiner

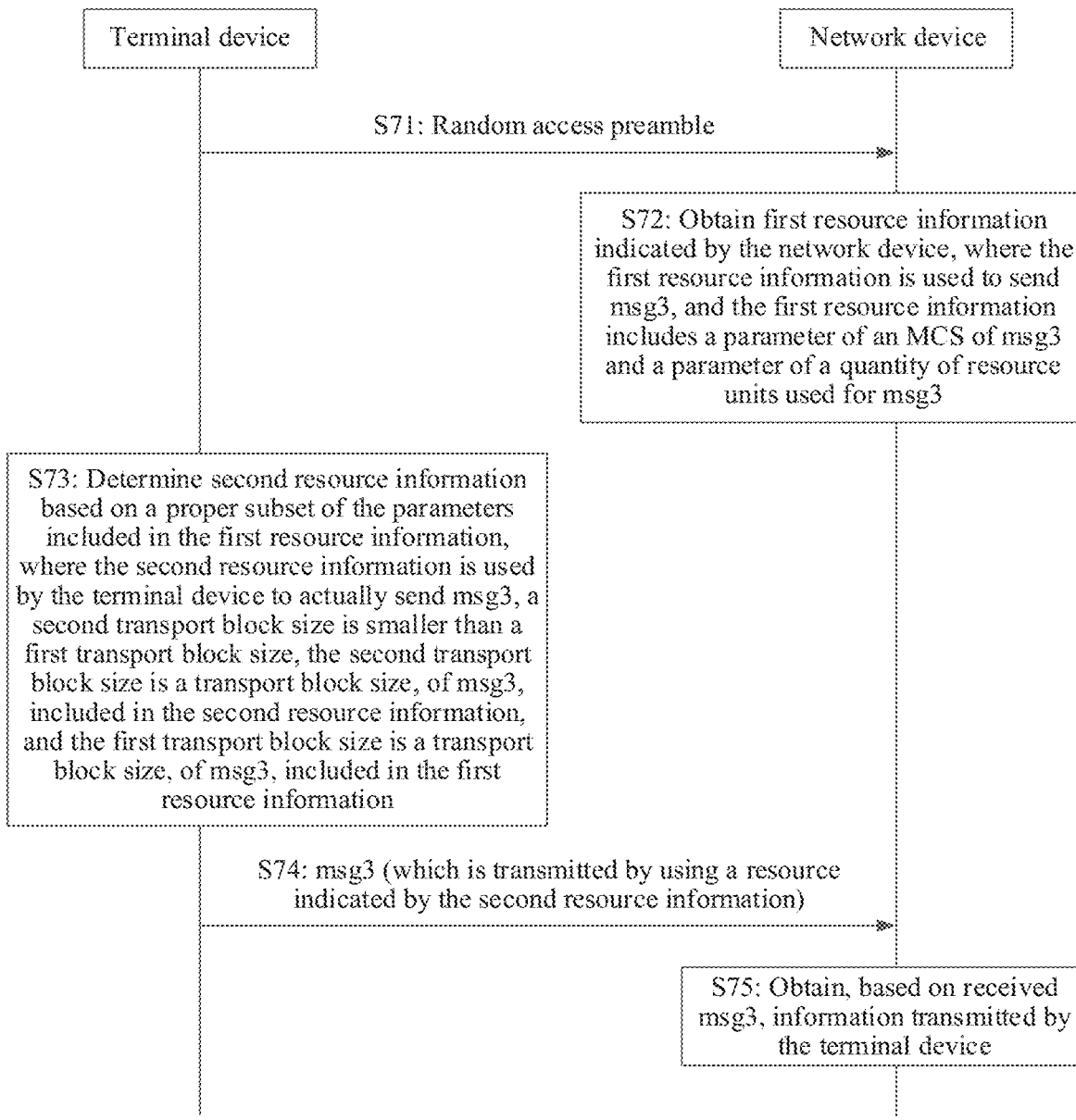

SIGNAL SENDING METHOD, SIGNAL RECEIVING METHOD, RESOURCE DETERMINING METHOD, AND DEVICE

CROSS-REFERENCE TO RELATED APPLICATIONS

This application is a continuation of International Application No. PCT/CN2018/074838, filed on Jan. 31, 2018, the disclosure of which is hereby incorporated by reference in its entirety.

TECHNICAL FIELD

This application relates to the field of communications technologies, and in particular, to a signal sending method, a signal receiving method, a resource determining method, and a device.

BACKGROUND

Uplink power control is very important in a wireless communications system. Through uplink power control, a terminal device can ensure quality of uplink data, and also minimize interference to the system and another user, thereby prolonging a battery usage time of the terminal device. In a current uplink power control manner, the terminal device sends a power headroom report (PHR) to a base station, and the base station controls an uplink transmit power of the terminal device based on the PHR sent by the terminal device.

In the existing narrowband internet of things (NB-IoT) release (Release (Rel)-13/14), the PHR is sent by the terminal device to the base station by using a media access control (MAC) control element (CE) in a third message (msg3) in a random access process.

Currently, how to further properly avoid power waste and interference to a network is a problem that needs to be urgently resolved.

SUMMARY

Embodiments of this application provide a signal sending method, a signal receiving method, a resource determining method, and a device, to properly avoid power waste and interference to a network.

According to a first aspect a first signal sending method is provided. The method may be performed by a terminal device. The method includes: generating a MAC CE, where the MAC CE is used to indicate a power headroom in a first power headroom set or a power headroom in a second power headroom set; and if the MAC CE is used to indicate the power headroom in the first power headroom set, the MAC CE includes a first bit field and a second bit field, the first bit field is a reserved bit field, and the second bit field is used to indicate the power headroom in the first power headroom set; or if the MAC CE is used to indicate the power headroom in the second power headroom set, the MAC CE includes a third bit field, the third bit field is used to indicate the power headroom in the second power headroom set, and the third bit field includes a bit of the first bit field and a bit of the second bit field; and sending the MAC CE to a network device.

Correspondingly, according to a second aspect, a first signal receiving method is provided. The method may be performed by a network device, and the network device is, for example, an access network device such as a base station. The method includes: receiving a MAC CE from a terminal device, where the MAC CE is used to indicate a power headroom in a first power headroom set or a power headroom in a second power headroom set; and determining the power headroom in the first power headroom set based on a second bit field included in the MAC CE, where the MAC CE includes a first bit field and the second bit field, and the first bit field is a reserved bit field; or determining the power headroom in the second power headroom set based on a third bit field included in the MAC CE, where the third bit field includes a bit of the first bit field and a bit of the second bit field.

In the embodiments of this application, the terminal device indicates the power headroom of the terminal device by using the third bit field included in the MAC CE. The bit of the second bit field that is included in the third bit field is an original reserved bit field in the MAC CE. This is equivalent to that in the embodiments of this application, an originally unused bit field in the MAC CE is used with the first bit field, in the MAC CE, that is originally used to indicate the power headroom, to jointly indicate the power headroom. In this case, because a quantity of bits used to indicate the power headroom increases, a quantity of power headrooms that can be indicated correspondingly increases. Alternatively, in the embodiments of this application, indicating the power headroom may be understood as indicating a PHR level, so that a quantity of PHR levels that can be indicated correspondingly increases. In this solution, a PHR of the terminal device may be divided into more power headroom levels, so that each power headroom level includes fewer power headrooms. In this way, a reporting granularity is reduced, and the terminal device can report a more precise power headroom. The network device can correspondingly perform more accurate power control on the terminal device, so that the terminal device can send data by using proper power. This avoids power waste and properly avoids interference to a network while ensuring transmission quality.

In a possible design, if the MAC CE is used to indicate the power headroom in the first power headroom set, the fourth bit field is a reserved bit field in the MAC CE; or if the MAC CE is used to indicate the power headroom in the second power headroom set, the fourth bit field is used to indicate that the power headroom is indicated by using the third bit field. Correspondingly, the method according to the second aspect further includes: the MAC CE further includes a fourth bit field; and if the MAC CE is used to indicate the power headroom in the first power headroom set, the fourth bit field is a reserved bit field in the MAC CE; or if the MAC CE is used to indicate the power headroom in the second power headroom set, determining, based on the fourth bit field, that the power headroom is indicated by using the third bit field.

The MAC CE may be used to indicate the power headroom in the first power headroom set, or may be used to indicate the power headroom in the second power headroom set. Therefore, the network device needs to know a power headroom in which power headroom set is indicated by the MAC CE, and then can finally determine the power headroom of the terminal device based on the corresponding power headroom set and the MAC CE. Therefore, in a manner, the MAC CE is also used to indicate whether the power headroom is indicated by using the third bit field or the power headroom is indicated by using the first bit field and the second bit field. However, the embodiments of this application focus on a case in which the power headroom is indicated by using the third bit field. Therefore, it may be considered that the MAC CE is used to indicate that the power headroom is indicated by using the third bit field. In this way, the network device may be notified of the power headroom set to which the specifically indicated power headroom belongs, so that the network device can determine the power headroom of the terminal device based on the correct power headroom set. This improves accuracy of the determined power headroom and avoids an error.

In a possible design, the method according to the first aspect further includes: sending first signaling to the network device, where the first signaling is used to indicate that the power headroom is indicated by using the third bit field; or sending the MAC CE to the network device through a CCCH, where a logical channel identifier of the CCCH is a first identifier, and the first identifier is used to indicate that the power headroom is indicated by using the third bit field. Correspondingly, the method according to the second aspect further includes: receiving first signaling from the terminal device, where the first signaling is used to indicate that the power headroom is indicated by using the third bit field; or receiving the MAC CE from the terminal device through a CCCH, where a logical channel identifier of the CCCH is a first identifier, and the first identifier is used to indicate that the power headroom is indicated by using the third bit field.

As described above, the network device needs to know a power headroom in which power headroom set is indicated by the MAC CE, and then can finally determine the power headroom of the terminal device based on the corresponding power headroom set and the MAC CE. Therefore, in another manner, the first signaling is used to indicate, to the network device, that the power headroom is indicated by using the third bit field, where the first signaling is, for example, higher layer signaling such as RRC signaling, or may be other signaling; or a logical channel number of the CCCH may be used to indicate that the power headroom is indicated by using the third bit field. Regardless which of the two manners is used for indication, no additional bit in the MAC CE needs to be occupied, so that more bits in the MAC CE can be used to indicate the power headroom. This further increases a quantity of bits in the MAC CE that are used to indicate the power headroom, so that the quantity of power headrooms that can be indicated further increases. In this way, finer power headroom levels can be obtained through division, and power headroom values included in each power headroom level may be fewer, so that accuracy of power headroom reporting is further increased.

In a possible design, the method according to the first aspect further includes: receiving second signaling from the network device, where the second signaling is used to instruct to indicate the power headroom by using the third bit field included in the MAC CE. Correspondingly, the method according to the second aspect further includes: sending second signaling to the terminal device, where the second signaling is used to instruct to indicate the power headroom by using the third bit field included in the MAC CE.

The network device may support the terminal device in indicating or require the terminal device to indicate the power headroom by using the third bit field, or may support the terminal device in indicating or require the terminal device to indicate the power headroom by using the first bit field and the second bit field. Therefore, the network device may notify the terminal device of an objective condition (to be specific, whether the network device supports indicating the power headroom by using the third bit field or by using the first bit field and the second bit field) or a requirement of the network device in advance by using the second signaling. For example, if the second signaling is used to instruct to indicate the power headroom by using the third bit field, the terminal device may indicate the power headroom by using the third bit field, so that an indication manner of the terminal device is consistent with a cognitive manner of the network device. This reduces an error rate. The second signaling is, for example, broadcast signaling. Strictly speaking, the network device actually broadcasts the second signaling instead of sending the second signaling to a device. However, the terminal device receives the second signaling. Therefore, it may be considered that the network device sends the second signaling to the terminal device.

According to a third aspect, a second signal sending method is provided. The method may be performed by a terminal device. The method includes: generating a MAC CE, where the MAC CE is used to indicate a power headroom in a first power headroom set or a power headroom in a second power headroom set, and the MAC CE includes a first bit field and a second bit field; and if the MAC CE is used to indicate the power headroom in the first power headroom set, the first bit field is a reserved bit field, and the second bit field is used to indicate the power headroom in the first power headroom set; or if the MAC CE is used to indicate the power headroom in the second power headroom set, the first bit field and the second bit field are used to indicate the power headroom in the second power headroom set; and sending the MAC CE to a network device.

Correspondingly, according to a fourth aspect, a second signal receiving method is provided. The method may be performed by a network device, and the network device is, for example, an access network device such as a base station. The method includes: receiving a MAC CE from a terminal device, where the MAC CE is used to indicate a power headroom in a first power headroom set or a power headroom in a second power headroom set, where the MAC CE includes a first bit field and a second bit field; and determining the power headroom in the first power headroom set based on the second bit field, where the first bit field is a reserved bit field; or determining the power headroom in the second power headroom set based on the first bit field and the second bit field.

In the embodiments of this application, the terminal device indicates the power headroom of the terminal device by using the first bit field and the second bit field included in the MAC CE. The second bit field is an original reserved bit field in the MAC CE. This is equivalent to that in the embodiments of this application, an originally unused bit field in the MAC CE is used with the first bit field, in the MAC CE, that is originally used to indicate the power headroom, to jointly indicate the power headroom. In this case, because a quantity of bits used to indicate the power headroom increases, a quantity of power headrooms that can be indicated correspondingly increases. Alternatively, in the embodiments of this application, indicating the power headroom may be understood as indicating a PHR level, so that a quantity of PHR levels that can be indicated correspondingly increases. In this solution, a PHR of the terminal device may be divided into more power headroom levels, so that each power headroom level includes fewer power headrooms. In this way, a reporting granularity is reduced, and the terminal device can report a more precise power headroom. The network device can correspondingly perform more accurate power control on the terminal device, so that the terminal device can send data by using proper power. This avoids power waste and properly avoids interference to a network while ensuring transmission quality.

In a possible design, the MAC CE further includes a fourth bit field; and if the MAC CE is used to indicate the power headroom in the first power headroom set, the fourth bit field is a reserved bit field in the MAC CE; or if the MAC CE is used to indicate the power headroom in the second power headroom set, the fourth bit field is used to indicate that the power headroom is indicated by using the first bit field and the second bit field. Correspondingly, the method according to the second aspect further includes: the MAC CE further includes a fourth bit field; and if the MAC CE is used to indicate the power headroom in the first power headroom set, the fourth bit field is a reserved bit field in the MAC CE; or if the MAC CE is used to indicate the power headroom in the second power headroom set, determining, based on the fourth bit field, that the power headroom is indicated by using the first bit field and the second bit field.

In a possible design, the method according to the third aspect further includes: sending first signaling to the network device, where the first signaling is used to indicate that the power headroom is indicated by using the third bit field; or sending the MAC CE to the network device through a CCCH, where a logical channel identifier of the CCCH is a first identifier, and the first identifier is used to indicate that the power headroom is indicated by using the third bit field. Correspondingly, the method according to the fourth aspect further includes: receiving first signaling from the terminal device, where the first signaling is used to indicate that the power headroom is indicated by using the first bit field and the second bit field; or receiving the MAC CE from the terminal device through a CCCH, where a logical channel identifier of the CCCH is a first identifier, and the first identifier is used to indicate that the power headroom is indicated by using the first bit field and the second bit field.

In a possible design, the method according to the third aspect further includes: receiving second signaling from the network device, where the second signaling is used to instruct to indicate the power headroom by using the third bit field included in the MAC CE. Correspondingly, the method according to the fourth aspect further includes: sending second signaling to the terminal device, where the second signaling is used to instruct to indicate the power headroom by using the first bit field and the second bit field included in the MAC CE.

The method according to the first aspect and the method according to the second aspect differ from the method according to the third aspect and the method according to the fourth aspect only in understanding of a bit field. In the method according to the first aspect and the method according to the second aspect, the bit field used to indicate the power headroom is understood as one entire bit field (namely, the third bit field). In the method according to the third aspect and the method according to the fourth aspect, the bit field used to indicate the power headroom is understood as two independent bit fields (namely, the first bit field and the second bit field). Other implementations of the methods are similar. Therefore, for technical effects of corresponding designs in the method according to the third aspect and the method according to the fourth aspect, refer to related descriptions of designs in the method according to the first aspect and the method according to the second aspect.

According to a fifth aspect, a third signal sending method is provided. The method may be performed by a terminal device. The method includes: when being in a connected state, generating a MAC CE carrying a BSR, where the MAC CE further includes at least 3 bits, and the at least 3 bits are used to indicate a power headroom; and sending the MAC CE to the network device.

Correspondingly, according to a sixth aspect, a third signal receiving method is provided. The method may be performed by a network device, and the network device is, for example, an access network device such as a base station. The method includes: receiving a MAC CE from a terminal device; and determining a power headroom of the terminal device based on at least 3 bits included in the MAC CE, and obtaining a BSR from the MAC CE.

In the embodiments of this application, the terminal device may indicate the power headroom of the terminal device to the network device when being in the connected state. For example, if the power headroom of the terminal device changes in a data transmission process, the terminal device may indicate the power headroom of the terminal device to the network device in the manner provided in the embodiments of this application, to improve uplink power control performance. In addition, the terminal device may add the power headroom of the terminal device and the BSR into one MAC CE for sending. This helps reduce signaling overheads.

In addition, in the embodiments of this application, the power headroom reported by the terminal device may be a power headroom in a first power headroom set, or may be a power headroom in a second power headroom set. If the power headroom is the power headroom in the second power headroom set, a PHR may be re-divided into more power headroom levels than four power headroom levels in Table 1. When a value range of the power headroom of the terminal device remains unchanged, the second power headroom set provided in the embodiments of this application can provide a finer division granularity, so that power headroom values included in each power headroom level are fewer than those in the current first power headroom set. In addition, in the embodiments of this application, more bits are provided to indicate the power headroom of the terminal device, to adapt to the newly provided power headroom set. In this way, a reporting granularity is reduced, and the terminal device can report a more precise power headroom. The network device can correspondingly perform more accurate power control on the terminal device, so that the terminal device can send data by using proper power. This avoids power waste and properly avoids interference to a network while ensuring transmission quality.

In a possible design, the MAC CE carrying the BSR is generated when at least one of the following conditions is met:

a difference between a first downlink path loss of the terminal device and a second downlink path loss of the terminal device is greater than a first threshold, where the first downlink path loss is a current downlink path loss of the terminal device, and the second downlink path loss is a downlink path loss caused when the terminal device last indicates a power headroom of the terminal device to the network device;

a difference between the power headroom and a first power headroom of the terminal device is greater than a second threshold, wherein the first power headroom is a power headroom last sent by the terminal device to the network device;

the first downlink path loss of the terminal device is greater than a third threshold, wherein the first downlink path loss is the current downlink path loss of the terminal device; and the power headroom is greater than a fourth threshold.

When being in a connected state, the terminal device may have more opportunities to send the BSR to the network device. In this case, the terminal device may indicate a power headroom of the terminal device each time the terminal device sends the BSR. Alternatively, because the power headroom of the terminal device may not continuously change the terminal device may not need to continuously indicate the power headroom to the network device. Continuously indicating the power headroom may even cause some interference to the network device and consume additional signaling overheads. Therefore, this embodiment of this application further provides a determining mechanism. The terminal device may determine, by using the determining mechanism, whether to indicate the power headroom of the terminal device to the network device. This can effectively avoid frequent reporting of the power headroom. In addition, the determining mechanism is relatively flexible, and at least one determining mechanism may be selected for use in actual application.

In a possible design, the method according to the fifth aspect further includes: receiving first signaling from the network device, where the first signaling is used to configure to indicate the power headroom while sending the BSR to the network device. Correspondingly, the method according to the sixth aspect further includes: sending first signaling to the terminal device, where the first signaling is used to configure the terminal device to indicate the power headroom while sending the BSR to the network device.

The network device may support the terminal device in indicating or require the terminal device to indicate the power headroom while sending the BSR to the network device, or may not support the terminal device in indicating or not require the terminal device to indicate the power headroom while sending the BSR to the network device. Therefore, if the network device supports the terminal device in indicating or requires the terminal device to indicate the power headroom while sending the BSR to the network device, the network device may configure the terminal device by using the first signaling, so that the terminal device may indicate the power headroom while sending the BSR to the network device in the manner provided in the embodiments of this application. If the network device does not configure the terminal device, the terminal device may not indicate the power headroom while sending the BSR to the network device. In this way, an operation manner of the terminal device is consistent with a support condition or a requirement of the network device, and an error rate is reduced. The first signaling is, for example, broadcast signaling. Strictly speaking, the network device actually broadcasts the first signaling instead of sending the first signaling to a device. However, the terminal device receives the first signaling. Therefore, it may be considered that the network device sends the first signaling to the terminal device.

According to a seventh aspect, a first resource determining method is provided. The method may be performed by a terminal device. The method includes: obtaining first resource information indicated by a network device, where the first resource information is used to send msg3, and the first resource information includes a parameter of a modulation and coding scheme of msg3 and a parameter of a quantity of resource units used for msg3; determining second resource information based on a proper subset of the parameters included in the first resource information, where the second resource information is used to actually send msg3, a second transport block size is smaller than a first transport block size, the second transport block size is a transport block size, of msg3, included in the second resource information, and the first transport block size is a transport block size, of msg3, included in the first resource information.

In this embodiment of this application, a data early transmission procedure may be used. In addition, the terminal device may directly not use redundant resources allocated by the network device, and does not need to add a large quantity of padding bits, so that the terminal device can reduce power consumption of the terminal device while transmitting the information to the network device.

According to an eighth aspect, a second resource determining method is provided. The method may be performed by a terminal device. The method includes: obtaining first resource information indicated by a network device, where the first resource information is used to send msg3, and the first resource information includes a parameter of an MCS of msg3 and a parameter of a quantity of resource units used for msg3; and re-determining second resource information when determining a first transport block size is greater than a second transport block size, where a transport block size included in the second resource information is the second transport block size. The second transport block size is a transport block size needed by the terminal device to actually send msg3, and the first transport block size is a transport block size, of msg3, included in the first resource information.

In this embodiment of this application, a data early transmission procedure may be used. In addition, if the network device allocates excessively many resources, the terminal device may totally re-determine a resource based on a resource needed by the terminal device to actually transmit msg3. In this way, the determined resource meets an actual transmission requirement of the terminal device, and there is no excessive resource. Therefore, the terminal device does not need to add a large quantity of padding bits, so that the terminal device can reduce power consumption of the terminal device while transmitting the information to the network device.

According to a ninth aspect, a third resource determining method is provided. The method may be performed by a terminal device. The method includes: obtaining a plurality of pieces of resource information indicated by a network device, where each of the plurality of pieces of the resource information is used to send msg3, and each piece of resource information includes a parameter of a modulation and coding scheme of msg3 and a parameter of a quantity of resource units used for msg3; and determining, based on a size of an actual to-be-sent msg3, to send the actual to-be-sent msg3 by using first resource information in the plurality of pieces of resource information.

In this embodiment of this application, the network device may allocate a plurality of pieces of resource information, so that the terminal device may select one piece of resource information from the plurality of pieces of resource information for use. In this way, the terminal device follows instruction of the network device, and uses an early data transmission procedure. In addition, the terminal device can select relatively proper resource information to transmit msg3, and does not need to add a large quantity of padding bits, so that the terminal device can reduce power consumption of the terminal device while transmitting the information to the network device.

In a possible design, the obtaining a plurality of pieces of resource information indicated by a network device includes: receiving a random access response message from the network device, where the random access response message carries the plurality of pieces of resource information, and the random access response message is further used to indicate a quantity of the plurality of pieces of resource information.

In this embodiment of this application, the random access response message may be used to carry the plurality of pieces of resource information, and the random access response message may be further used to indicate the quantity of the plurality of pieces of resource information. In this way, after receiving the random access response message, the terminal device can determine the quantity of the plurality of pieces of resource information carried in the random access response message, to correctly obtain the plurality of pieces of resource information. In addition, the quantity of the plurality of pieces of resource information does not need to be indicated by using additional signaling. This helps save transmission resources.

According to a tenth aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processor and a transceiver. The processor and the transceiver may perform corresponding functions in the method provided in any one of the first aspect or the possible designs of the first aspect.

According to an eleventh aspect, a communications apparatus is provided. The communications apparatus is, for example, a network device. The network device has functions for implementing the network device in the foregoing method designs. These functions may be implemented by hardware, or may be implemented by hardware executing corresponding software. The hardware or the software includes one or more units corresponding to the foregoing functions.

In a possible design, a specific structure of the network device may include a processor and a transceiver. The processor and the transceiver may perform corresponding functions in the method provided in any one of the second aspect or the possible designs of the second aspect.

According to a twelfth aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processor and a transceiver. The processor and the transceiver may perform corresponding functions in the method provided in any one of the third aspect or the possible designs of the third aspect.

According to a thirteenth aspect, a communications apparatus is provided. The communications apparatus is, for example, a network device. The network device has functions for implementing the network device in the foregoing method designs. These functions may be implemented by hardware, or may be implemented by hardware executing corresponding software. The hardware or the software includes one or more units corresponding to the foregoing functions.

In a possible design, a specific structure of the network device may include a processor and a transceiver. The processor and the transceiver may perform corresponding functions in the method provided in any one of the fourth aspect or the possible designs of the fourth aspect.

According to a fourteenth aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processor and a transceiver. The processor and the transceiver may perform corresponding functions in the method provided in any one of the fifth aspect or the possible designs of the fifth aspect.

According to a fifteenth aspect, a communications apparatus is provided. The communications apparatus is, for example, a network device. The network device has functions for implementing the network device in the foregoing method designs. These functions may be implemented by hardware, or may be implemented by hardware executing corresponding software. The hardware or the software includes one or more units corresponding to the foregoing functions.

In a possible design, a specific structure of the network device may include a processor and a transceiver. The processor and the transceiver may perform corresponding functions in the method provided in any one of the sixth aspect or the possible designs of the sixth aspect.

According to a sixteenth aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processor and a transceiver. The processor and the transceiver may perform corresponding functions in the method provided in the seventh aspect.

According to a seventeenth aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processor and a transceiver. The processor and the transceiver may perform the eighth aspect or corresponding functions in the method provided in the eighth aspect.

According to an eighteenth aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processor and a transceiver. The processor and the transceiver may perform corresponding functions in the method provided in any one of the ninth aspect or the possible designs of the ninth aspect.

According to a nineteenth aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processing module and a transceiver module. The processing module and the transceiver module may perform corresponding functions in the method provided in any one of the first aspect or the possible designs of the first aspect.

According to a twentieth aspect, a communications apparatus is provided. The communications apparatus is, for example, a network device. The network device has functions for implementing the network device in the foregoing method designs. These functions may be implemented by hardware, or may be implemented by hardware executing corresponding software. The hardware or the software includes one or more units corresponding to the foregoing functions.

In a possible design, a specific structure of the network device may include a processing module and a transceiver module. The processing module and the transceiver module may perform corresponding functions in the method provided in any one of the second aspect or the possible designs of the second aspect.

According to a twenty-first aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processing module and a transceiver module. The processing module and the transceiver module may perform corresponding functions in the method provided in any one of the third aspect or the possible designs of the third aspect.

According to a twenty-second aspect, a communications apparatus is provided. The communications apparatus is, for example, a network device. The network device has functions for implementing the network device in the foregoing method designs. These functions may be implemented by hardware, or may be implemented by hardware executing corresponding software. The hardware or the software includes one or more units corresponding to the foregoing functions.

In a possible design, a specific structure of the network device may include a processing module and a transceiver module. The processing module and the transceiver module may perform corresponding functions in the method provided in any one of the fourth aspect or the possible designs of the fourth aspect.

According to a twenty-third aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processing module and a transceiver module. The processing module and the transceiver module may perform corresponding functions in the method provided in any one of the fifth aspect or the possible designs of the fifth aspect.

According to a twenty-fourth aspect, a communications apparatus is provided. The communications apparatus is, for example, a network device. The network device has functions for implementing the network device in the foregoing method designs. These functions may be implemented by hardware, or may be implemented by hardware executing corresponding software. The hardware or the software includes one or more units corresponding to the foregoing functions.

In a possible design, a specific structure of the network device may include a processing module and a transceiver module. The processing module and the transceiver module may perform corresponding functions in the method provided in any one of the sixth aspect or the possible designs of the sixth aspect.

According to a twenty-fifth aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processing module and a transceiver module. The processing module and the transceiver module may perform corresponding functions in the method provided in the seventh aspect.

According to a twenty-sixth aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processing module and a transceiver module. The processing module and the transceiver module may perform the eighth aspect or corresponding functions in the method provided in the eighth aspect.

According to a twenty-seventh aspect, a communications apparatus is provided. The communications apparatus is, for example, a terminal device. The terminal device has functions for implementing the terminal device in the foregoing method designs. These functions may be implemented by hardware, or may be implemented by hardware executing corresponding software. The hardware or the software includes one or more units corresponding to the foregoing functions.

In a possible design, a specific structure of the terminal device may include a processing module and a transceiver module. The processing module and the transceiver module may perform corresponding functions in the method provided in any one of the ninth aspect or the possible designs of the ninth aspect.

According to a twenty-eighth aspect, a communications apparatus is provided. The communications apparatus may be the terminal device in the foregoing method designs, or a chip disposed in the terminal device. The communications apparatus includes a memory, configured to store computer executable program code; and a processor, where the processor is coupled to the memory. The program code stored in the memory includes an instruction. When the processor executes the instruction, the communications apparatus is enabled to perform the method in any one of the first aspect or the possible designs of the first aspect.

According to a twenty-ninth aspect, a communications apparatus is provided. The communications apparatus may be the network device in the foregoing method designs, or a chip disposed in the network device. The communications apparatus includes a memory, configured to store computer executable program code; and a processor, where the processor is coupled to the memory. The program code stored in the memory includes an instruction. When the processor executes the instruction, the communications apparatus is enabled to perform the method in any one of the second aspect or the possible designs of the second aspect.

According to a thirtieth aspect, a communications apparatus is provided. The communications apparatus may be the terminal device in the foregoing method designs, or a chip disposed in the terminal device. The communications apparatus includes a memory, configured to store computer executable program code; and a processor, where the processor is coupled to the memory. The program code stored in the memory includes an instruction. When the processor executes the instruction, the communications apparatus is enabled to perform the method in any one of the third aspect or the possible designs of the third aspect.

According to a thirty-first aspect, a communications apparatus is provided. The communications apparatus may be the network device in the foregoing method designs, or a chip disposed in the network device. The communications apparatus includes a memory, configured to store computer executable program code; and a processor, where the processor is coupled to the memory. The program code stored in the memory includes an instruction. When the processor executes the instruction, the communications apparatus is enabled to perform the method in any one of the fourth aspect or the possible designs of the fourth aspect.

According to a thirty-second aspect, a communications apparatus is provided. The communications apparatus may be the terminal device in the foregoing method designs, or a chip disposed in the terminal device. The communications apparatus includes a memory, configured to store computer executable program code; and a processor, where the processor is coupled to the memory. The program code stored in the memory includes an instruction. When the processor executes the instruction, the communications apparatus is enabled to perform the method in any one of the fifth aspect or the possible designs of the fifth aspect.

According to a thirty-third aspect, a communications apparatus is provided. The communications apparatus may be the network device in the foregoing method designs, or a chip disposed in the network device. The communications apparatus includes a memory, configured to store computer executable program code; and a processor, where the processor is coupled to the memory. The program code stored in the memory includes an instruction. When the processor executes the instruction, the communications apparatus is enabled to perform the method in any one of the sixth aspect or the possible designs of the sixth aspect.

According to a thirty-fourth aspect, a communications apparatus is provided. The communications apparatus may be the terminal device in the foregoing method designs, or a chip disposed in the terminal device. The communications apparatus includes a memory, configured to store computer executable program code; and a processor, where the processor is coupled to the memory. The program code stored in the memory includes an instruction. When the processor executes the instruction, the communications apparatus is enabled to perform the method in any one of the seventh aspect or the possible designs of the seventh aspect.

According to a thirty-fifth aspect, a communications apparatus is provided. The communications apparatus may be the terminal device in the foregoing method designs, or a chip disposed in the terminal device. The communications apparatus includes a memory, configured to store computer executable program code; and a processor, where the processor is coupled to the memory. The program code stored in the memory includes an instruction. When the processor executes the instruction, the communications apparatus is enabled to perform the method in any one of the eighth aspect or the possible designs of the eighth aspect.

According to a thirty-sixth aspect, a communications apparatus is provided. The communications apparatus may be the terminal device in the foregoing method designs, or a chip disposed in the terminal device. The communications apparatus includes a memory, configured to store computer executable program code; and a processor, where the processor is coupled to the memory. The program code stored in the memory includes an instruction. When the processor executes the instruction, the communications apparatus is enabled to perform the method in any one of the ninth aspect or the possible designs of the ninth aspect.

According to a thirty-seventh aspect, a first communications system is provided. The communications system includes a terminal device and a network device. The terminal device is configured to: generate a MAC CE, where the MAC CE is used to indicate a power headroom in a first power headroom set or a power headroom in a second power headroom set; and if the MAC CE is used to indicate the power headroom in the first power headroom set, the MAC CE includes a first bit field and a second bit field, the first bit field is a reserved bit field, and the second bit field is used to indicate the power headroom in the first power headroom set; or if the MAC CE is used to indicate the power headroom in the second power headroom set, the MAC CE includes a third bit field, the third bit field is used to indicate the power headroom in the second power headroom set, and the third bit field includes a bit of the first bit field and a bit of the second bit field; and send the MAC CE to the network device. The network device is configured to: receive the MAC CE from the terminal device, where the MAC CE is used to indicate the power headroom in the first power headroom set or the power headroom in the second power headroom set; and determine the power headroom in the first power headroom set based on the second bit field included in the MAC CE, where the MAC CE includes the first bit field and the second bit field, and the first bit field is the reserved bit field; or determine the power headroom in the second power headroom set based on the third bit field included in the MAC CE, where the third bit field includes the bit of the first bit field and the bit of the second bit field.

According to a thirty-eighth aspect, a second communications system is provided. The communications system includes a terminal device and a network device. The terminal device is configured to: generate a MAC CE, where the MAC CE is used to indicate a power headroom in a first power headroom set or a power headroom in a second power headroom set, and the MAC CE includes a first bit field and a second bit field; and if the MAC CE is used to indicate the power headroom in the first power headroom set, the first bit field is a reserved bit field, and the second bit field is used to indicate the power headroom in the first power headroom set; or if the MAC CE is used to indicate the power headroom in the second power headroom set, the first bit field and the second bit field are used to indicate the power headroom in the second power headroom set; and send the MAC CE to the network device. The network device is configured to: receive the MAC CE from the terminal device, where the MAC CE is used to indicate the power headroom in the first power headroom set or the power headroom in the second power headroom set, and the MAC CE includes the first bit field and the second bit field; and determine the power headroom in the first power headroom set based on the second bit field, where the first bit field is the reserved bit field; or determine the power headroom in the second power headroom set based on the first bit field and the second bit field.

According to a thirty-ninth aspect, a third communications system is provided. The communications system includes a terminal device and a network device. The terminal device is configured to: when being in a connected state, generate a MAC CE carrying a BSR, where the MAC CE further includes at least 3 bits, and the at least 3 bits are used to indicate a power headroom; and send the MAC CE to the network device. The network device is configured to: receive the MAC CE from the terminal device; and determine the power headroom of the terminal device based on the at least 3 bits included in the MAC CE, and obtain the BSR from the MAC CE.

The communications system provided in the thirty-seventh aspect, the communications system provided in the thirty-eighth aspect, and the communications system provided in the thirty-ninth aspect may be three different communications systems, or at least two of the three communications systems may be a same communications system.

According to a fortieth aspect, a computer storage medium is provided. The computer-readable storage medium stores an instruction, and when the instruction is run on a computer, the computer is enabled to perform the method in any one of the first aspect or the possible designs of the first aspect.

According to a forty-first aspect, a computer storage medium is provided. The computer-readable storage medium stores an instruction, and when the instruction is run on a computer, the computer is enabled to perform the method in any one of the second aspect or the possible designs of the second aspect.

According to a forty-second aspect, a computer storage medium is provided. The computer-readable storage medium stores an instruction, and when the instruction is run on a computer, the computer is enabled to perform the method in any one of the third aspect or the possible designs of the third aspect.

According to a forty-third aspect, a computer storage medium is provided. The computer-readable storage medium stores an instruction, and when the instruction is run on a computer, the computer is enabled to perform the method in any one of the fourth aspect or the possible designs of the fourth aspect.

According to a forty-fourth aspect, a computer storage medium is provided. The computer-readable storage medium stores an instruction, and when the instruction is run on a computer, the computer is enabled to perform the method in any one of the fifth aspect or the possible designs of the fifth aspect.

According to a forty-fifth aspect, a computer storage medium is provided. The computer-readable storage medium stores an instruction, and when the instruction is run on a computer, the computer is enabled to perform the method in any one of the sixth aspect or the possible designs of the sixth aspect.

According to a forty-sixth aspect, a computer storage medium is provided. The computer-readable storage medium stores an instruction, and when the instruction is run on a computer, the computer is enabled to perform the method in any one of the seventh aspect or the possible designs of the seventh aspect.

According to a forty-seventh aspect, a computer storage medium is provided. The computer-readable storage medium stores an instruction, and when the instruction is run on a computer, the computer is enabled to perform the method in any one of the eighth aspect or the possible designs of the eighth aspect.

According to a forty-eighth aspect, a computer storage medium is provided. The computer-readable storage medium stores an instruction, and when the instruction is run on a computer, the computer is enabled to perform the method in any one of the ninth aspect or the possible designs of the ninth aspect.

According to a forty-ninth aspect, a computer program product including an instruction is provided. The computer program product stores the instruction, and when the instruction is run on a computer, the computer is enabled to perform the method in any one of the first aspect or the possible designs of the first aspect.

According to a fiftieth aspect, a computer program product including an instruction is provided. The computer program product stores the instruction, and when the instruction is run on a computer, the computer is enabled to perform the method in any one of the second aspect or the possible designs of the second aspect.

According to a fifty-first aspect, a computer program product including an instruction is provided. The computer program product stores the instruction, and when the instruction is run on a computer, the computer is enabled to perform the method in any one of the third aspect or the possible designs of the third aspect.

According to a fifty-second aspect, a computer program product including an instruction is provided. The computer program product stores the instruction, and when the instruction is run on a computer, the computer is enabled to perform the method in any one of the fourth aspect or the possible designs of the fourth aspect.

According to a fifty-third aspect, a computer program product including an instruction is provided. The computer program product stores the instruction, and when the instruction is run on a computer, the computer is enabled to perform the method in any one of the fifth aspect or the possible designs of the fifth aspect.

According to a fifty-fourth aspect, a computer program product including an instruction is provided. The computer program product stores the instruction, and when the instruction is run on a computer, the computer is enabled to perform the method in any one of the sixth aspect or the possible designs of the sixth aspect.

According to a fifty-fifth aspect, a computer program product including an instruction is provided. The computer program product stores the instruction, and when the instruction is run on a computer, the computer is enabled to perform the method in any one of the seventh aspect or the possible designs of the seventh aspect.

According to a fifty-sixth aspect, a computer program product including an instruction is provided. The computer program product stores the instruction, and when the instruction is run on a computer, the computer is enabled to perform the method in any one of the eighth aspect or the possible designs of the eighth aspect.

According to a fifty-seventh aspect, a computer program product including an instruction is provided. The computer program product stores the instruction, and when the instruction is run on a computer, the computer is enabled to perform the method in any one of the ninth aspect or the possible designs of the ninth aspect.

In the embodiments of this application, the power headroom is jointly indicated by using the original unused bit field in the MAC CE and the first bit field, in the MAC CE, that is originally used to indicate the power headroom. The terminal device can report a more precise power headroom. The network device can correspondingly perform more accurate power control on the terminal device, so that the terminal device can send data by using proper power. This avoids power waste and properly avoids interference to a network while ensuring transmission quality.

BRIEF DESCRIPTION OF DRAWINGS

FIG. 6 is a schematic diagram of a MAC CE that carries a power headroom of a terminal device and a BSR according to an embodiment of this application;

FIG. 7 is a flowchart of a first resource determining method according to an embodiment of this application;

DESCRIPTION OF EMBODIMENTS

Figure 1:
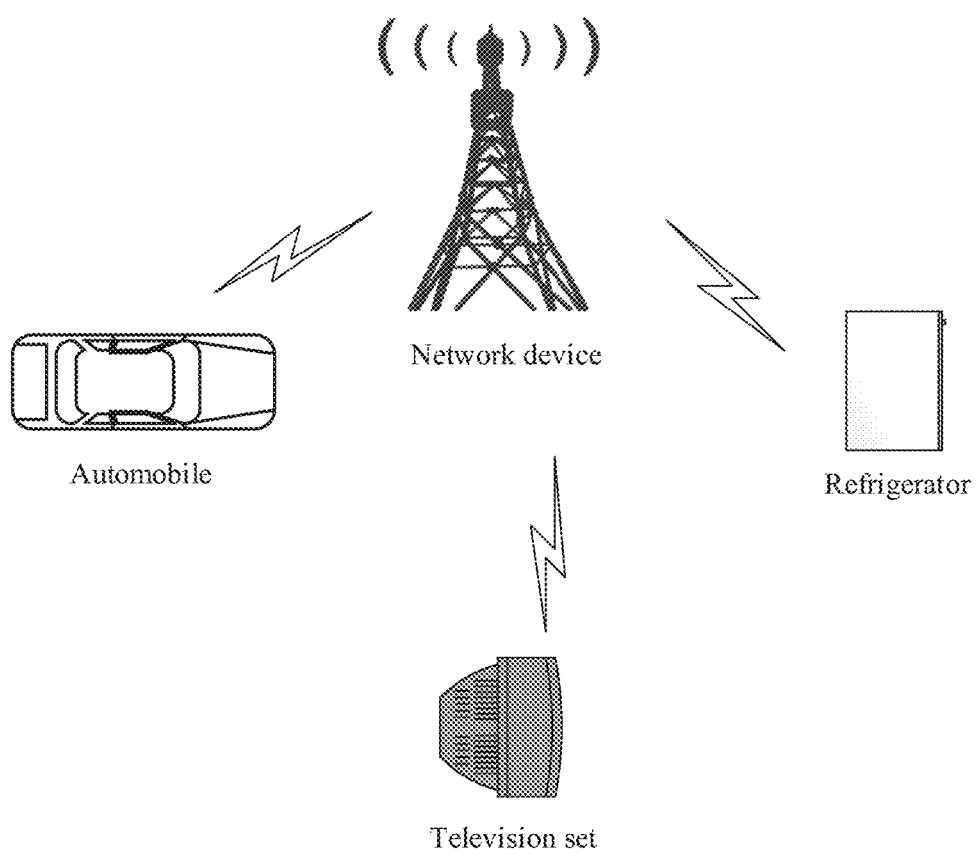
FIG. 1 is a schematic diagram of an application scenario according to an embodiment of this application.

To make the purpose, technical solutions, and advantages of the embodiments of this application clearer, the following clearly and completely describes the technical solutions of the embodiments of this application with reference to the accompanying drawings in the embodiments of this application.

Some terms in the embodiments of this application are described below, to facilitate understanding of a person skilled in the art.

1. A terminal device includes a device that provides a user with voice and/or data connectivity, for example, may include a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a subscriber unit, a subscriber station, a mobile station, a mobile, a remote station, an access point (AP), a remote terminal device, an access terminal device, a user terminal device, a user agent, a user device, or the like. For example, the terminal device may include a mobile phone (or referred to as a "cellular" phone), a computer having a mobile terminal device, a portable, pocket-sized, handheld, computer-embedded, or vehicle-mounted mobile apparatus, or a smart wearable device. For example, the terminal device is a device such as a personal communication service (PCS) phone, a cordless telephone set, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device such as a bar code, a radio frequency identification (RFID), a sensor, a global positioning system (GPS), or a laser scanner.

As an example instead of a limitation, the terminal device in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, for example, smartwatches or smart glasses, and devices that focus on only one type of application function and need to work with other devices such as smartphones, for example, various smart bands, smart helmets, or smart jewelry for monitoring physical signs.

2. A network device, for example, including a base station (for example, an access point), may be a device that is in an access network and that communicates with a wireless terminal device over an air interface through one or more cells. The network device may be configured to mutually convert a received over-the-air frame and an internet protocol (IP) packet and serve as a router between the terminal device and a rest portion of the access network, where the rest portion of the access network may include an IP network. The network device may coordinate attribute management of the air interface. For example, the network device may include an evolved NodeB (NodeB, or eNB, or e-NodeB) in a long term evolution (LTE) system or an LTE advanced (LTE-A) system, or may include a next generation NodeB (gNB) in a 5th generation mobile communications technology (5G) new radio (NR) system, or may include a centralized unit (CU) and a distributed unit in a cloud access network (CloudRAN) system. This is not limited in the embodiments of this application.

3. NB-IoT: Currently, the 3rd generation partnership project (3GPP) standard focuses on carrying an IoT service based on a cellular network by designing a new air interface and fully using a characteristic of a narrowband technology. This type of IoT is referred to as NB-IoT. Compared with a conventional cellular network, a service and a terminal device in an NB-IoT system have the following features:

(1) Low service rate and long service period: Compared with the conventional cellular network, the NB-IoT service generates smaller data packets, and is usually insensitive to a delay.

(2) Massive-connection requirement: One NB-IoT base station may cover a large quantity of internet of things terminal devices such as smart water/electricity meters, smart households, vehicles, and wearable devices that are massively deployed. For example, a quantity of the terminal devices may exceed tens of thousands.

(3) Low-cost requirement: Compared with an existing cellular network terminal device, the NB-IoT system requires a lower-cost terminal device, to implement massive deployment of terminal devices. The low-cost requirement requires that implementation complexity of the terminal device is also very low.

(4) Low power consumption requirement: The NB-IoT system requires lower power consumption of the terminal device, to save battery power of the terminal device, and ensure that the terminal device has an extra-long standby time, so as to reduce labor costs of battery replacement.

To meet the foregoing requirements such as low costs and deep coverage, the NB-IoT system has many special designs. For example, the NB-IoT system has no PUCCH, to simplify the terminal device and reduce costs. In addition, to implement deep coverage, a control channel (for example, a narrowband physical downlink control channel (NPDCCH)), a data channel (for example, a narrowband physical downlink shared channel (NPDSCH), and a narrowband physical uplink shared channel (NPUSCH)) that are in the NB-IoT system are repeatedly sent, so that a probability that a terminal device with relatively poor coverage successfully receives same content is increased through hundreds or thousands of times of repeated sending.

4. A PHR represents transmit power that can be used by the terminal device other than transmit power used for current physical uplink shared channel (PUSCH) transmission. In this case, the PHR is a difference between a maximum transmit power allowed by the terminal device and a currently evaluated PUSCH transmit power, and may be simply expressed by using a formula: PH=UEAllowedMaxTransPower−PuschPower. UEAllowedMaxTransPower represents the maximum transmit power allowed by the terminal device, and PuschPower represents the currently evaluated PUSCH transmit power. Alternatively, a PHR represents transmit power that can be used by the terminal device other than transmit power used for current PUSCH transmission and physical uplink control channel (PUCCH) transmission. In this case, the PHR is a difference between a maximum transmit power allowed by the terminal device and a currently evaluated PUSCH transmit power and PUCCH transmit power, and may be simply represented by using a formula: PH=UEAllowedMaxTransPower−PuschPower−PucchPower. UEAllowedMaxTransPower represents the maximum transmit power allowed by the terminal device, PuschPower represents the currently evaluated PUSCH transmit power, and PucchPower represents the currently evaluated PUCCH transmit power.

A reason for defining a power headroom is that the power headroom may be used by the network device as a reference basis for allocating an uplink resource block (RB) resource. An example in which the PHR is the difference between the maximum transmit power allowed by the terminal device and the currently evaluated PUSCH transmit power is used. For example, if a PH value is negative, it indicates that the current PUSCH transmit power has exceeded the maximum transmit power allowed by the terminal device, and uplink RB resources allocated to the terminal device may be reduced during next scheduling; and if a PH value is positive, a quantity of subsequently allocated uplink RBs may continue to be increased.

5. A random access process is a process from a time at which the terminal device sends a random access preamble to attempt to access a network to a time at which the terminal device establishes a basic signaling connection to the network device. Random access is a key step in a mobile communications system, and a last step for establishing a communication link between the terminal device and the network device. For example, the terminal device exchanges information with the network device by using the random access process, to complete a subsequent operation such as calling, resource requesting, or data transmission. In addition, the terminal device may further implement uplink time synchronization with a system through random access.

The random access process may include a contention-based random access process and a contention-free random access process. The embodiments of this application are mainly described by using the contention-based random access process as an example.

The contention-based random access process may usually include four steps:

Step 1: A terminal device sends a random access preamble to a network device, and the network device receives the random access preamble from the terminal device, where the random access preamble is also referred to as a first message (msg1) in the random access process.

Step 2: The network device sends a random access response (RAR) message to the terminal device, and the terminal device receives the RAR message from the network device, where the RAR message is also referred to as a second message (msg2) in the random access process.

Step 3: The terminal device sends, to the network device, uplink signaling used to establish a radio resource control (RRC) connection, and the network device receives the uplink signaling from the terminal device. The uplink signaling is also referred to as msg3 in the random access process. The uplink signaling may usually include an RRC signaling part, a MAC CE, and the like. The RRC signaling may vary in different scenarios, for example, may be an RRC connection setup request, an RRC reestablishment request, or an RRC resume request.

Step 4: The network device sends an RRC connection setup message to the terminal device, and the terminal device receives the RRC connection setup message from the network device. The RRC connection setup message is also referred to as a fourth message (msg4) in the random access process.

6) The terms "system" and "network" in the embodiments of this application may be used interchangeably. "A plurality of" means two or more than two. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" unless otherwise specified, usually indicates an "or" relationship between the associated objects.

In addition, unless otherwise stated, ordinal numbers, such as "first" and "second", mentioned in the embodiments of this application are intended to distinguish between a plurality of objects, but are not intended to limit a sequence, a time sequence, priorities, or importance levels of the plurality of objects.

The foregoing describes some concepts included in the embodiments of this application, and the following describes the technical background of the embodiments of this application.

Mobile communications have greatly changed people's lives, but the pursuit of mobile systems with higher performance has never stopped. A 5G system emerges to cope with future explosive growth of mobile data traffic, massive device connections, and continuous emergence of various new services and application scenarios. As a part of 5G, the internet of things has a rapidly increasing market demand. A forecast shows that by the year 2022, a quantity of connections to 5G internet of things will reach 18 billion.

Currently, the 3rd generation partnership project (3GPP) standard has proposed a solution based on a cellular network and a characteristic of the internet of things. For example, in an NB-IoT system, an IoT service is carried by using a characteristic of a narrowband technology. The NB-IoT system uses a new air interface technology independent of the existing cellular network (LTE), the terminal device has lower costs, and supports a lower rate and lower mobility.

In an early release (Rel-13/14) of the NB-IoT system, there are many unique designs for small data packet transmission characteristics of the internet of things. For example, considering that an amount of transmitted data is relatively small, a time is relatively short, and the terminal has low mobility, a power headroom is reported only once when a connection is established, and a power headroom reporting granularity is larger than that in LTE. This reduces complexity of the terminal device and signaling overheads required for reporting the power headroom. Table 1 is a power headroom table to which power headrooms that can be reported in the current NB-IoT system belong. Each entry in Table 1 represents a power headroom level (where for example, PH=0 represents a power headroom level, and PH=1 represents another power headroom level). In Table 1, an entry may also be understood as a row. It can be learned that in the current NB-IoT system, the PHR is divided into only four power headroom levels shown in Table 1, and each power headroom level corresponds to a plurality of specific power headroom values. For example, if the terminal device determines that a power headroom of the terminal device is a first power headroom, the terminal device determines a power headroom level that is in the four power headroom levels shown in Table 1 and to which the first power headroom belongs, and then sends the determined power headroom level to the base station. The base station determines the power headroom of the terminal device based on the power headroom level sent by the terminal device.

TABLE 1

| PH | Power headroom level (Power Headroom Level) |
| --- | --- |
| 0 | POWER_HEADROOM_0 |
| 1 | POWER_HEADROOM_1 |
| 2 | POWER_HEADROOM_2 |
| 3 | POWER_HEADROOM_3 |

Currently, there are only four power headroom levels, and therefore, a power headroom range of each power headroom level is relatively large. In other words, each power headroom level corresponds to relatively many power headroom values. Consequently, a reporting granularity is also relatively large. For example, a difference between the first power headroom and a second power headroom is relatively large, but both the first power headroom and the second power headroom are covered in the power headroom level corresponding to PH=1 in Table 1. In this case, regardless whether the power headroom of the terminal device is the first power headroom or the second power headroom, a power headroom level reported by the terminal device is the power headroom level corresponding to PH=1. In this case, when the network device determines the power headroom of the terminal device based on the power headroom level reported by the terminal device, it is likely that the power headroom of the terminal device is the first power headroom, but the network device determines that the power headroom of the terminal device is the second power headroom. It can be learned that a relatively large reporting granularity leads to an inaccurate reported power headroom, and consequently, the power headroom of the terminal device that is determined by the network device is inaccurate.

With increasing commercial use of NB-IoT, more and more application scenarios are discovered, and new challenges are brought. For example, some applications have a relatively high requirement on a granularity of the PHR, and some terminal devices (for example, shared bicycles) may move in a transmission process. In these new scenarios, the existing power headroom reporting granularity is excessively large, and consequently, the reported power headroom is inaccurate. In addition, the power headroom cannot be reported after the power headroom changes in the data transmission process. Consequently, uplink power control performance is poor.

Therefore, in the embodiments of this application, a method for reporting the power headroom in NB-IoT is optimized, to adapt to the requirement of the new application scenarios. The embodiments of this application may be applied to the NB-IoT system, or may be applied to another similar communications system.

The technical background of the embodiments of this application is described above. FIG. 1 is a schematic diagram of an application scenario according to an embodiment of this application.

FIG. 1 includes a network device and a plurality of terminal devices. These terminal devices are terminal devices in an NB-IoT system, and for example, include a refrigerator, a vehicle, and a television. The network device is, for example, an access network device such as a base station. The network device and the at least one terminal device shown in FIG. 1 may be configured to implement the technical solutions provided in the embodiments of this application.

The technical solutions provided in the embodiments of this application are described below in detail with reference to the accompanying drawings. In the following description process, an example in which the technical solutions provided in the embodiments of this application are applied to the application scenario shown in FIG. 1 is used. Certainly, this is not limited in actual application. In addition, in this specification, the power headroom table may also be understood as a power headroom set. For example, the power headroom table shown in Table 1 may be understood as a first power headroom set. A new power headroom table to be provided in the embodiments of this application may also be understood as another power headroom set. For example, the new power headroom table provided in the embodiments of this application may be understood as a second power headroom set. In other words, the two terms "table" and "set" may be replaced with each other in the embodiments of this application.

An embodiment of this application provides a first signal sending and receiving method. In the first signal sending and receiving method, a terminal device indicates a power headroom of the terminal device when sending msg3 to a network device. In other words, in the first signal sending and receiving method, the terminal device indicates the power headroom of the terminal device to the network device in a random access process. In addition, in the first signal sending method, that the terminal device indicates the power headroom of the terminal device to the network device may also be understood as that the terminal device indicates, to the network device, a power headroom level to which the power headroom of the terminal device belongs, or that the terminal device indicates the power headroom of the terminal device to the network device may be understood as being implemented by indicating, to the network device, a power headroom level to which the power headroom of the terminal device belongs.

In the first signal sending and receiving method, this embodiment of this application provides at least one new power headroom table. The following mainly uses an example in which one new power headroom table is provided. In actual application, a quantity of new power headroom tables is not limited. For example, the new power headroom table provided in this embodiment of this application is referred to as a first power headroom table, and the first power headroom table may also be understood as a second power headroom set. The first power headroom table includes at least five entries. For a form of each entry, refer to a form of any entry in Table 1. Similarly, each entry represents a power headroom level. To be specific, in this embodiment of this application, the PHR may be re-divided into more power headroom levels than the four power headroom levels in Table 1, and each power headroom level may also correspond to a plurality of specific power headroom values. However, compared with the power headroom table shown in Table 1, a quantity of power headroom values corresponding to each of the at least one power headroom level included in the first power headroom table is less than a quantity of power headroom values corresponding to a power headroom level included in the power headroom table shown in Table 1. In this case, when a value range of the power headroom of the terminal device remains unchanged, the first power headroom table provided in this embodiment of this application can provide a finer division granularity, so that the power headroom values included in each power headroom level are fewer than those in the current Table 1. In this way, the reporting granularity is reduced, so that accuracy of the power headroom of the terminal device that is determined by the network device is improved. If this embodiment of this application provides a plurality of power headroom tables, power headroom levels included in different power headroom tables may be different, or power headroom levels included in at least two of the power headroom tables may partially overlap. In addition, the power headroom levels included in the power headroom table provided in this embodiment of this application and the power headroom levels included in the power headroom table shown in Table 1 may be different, or may partially overlap.

Figure 2:
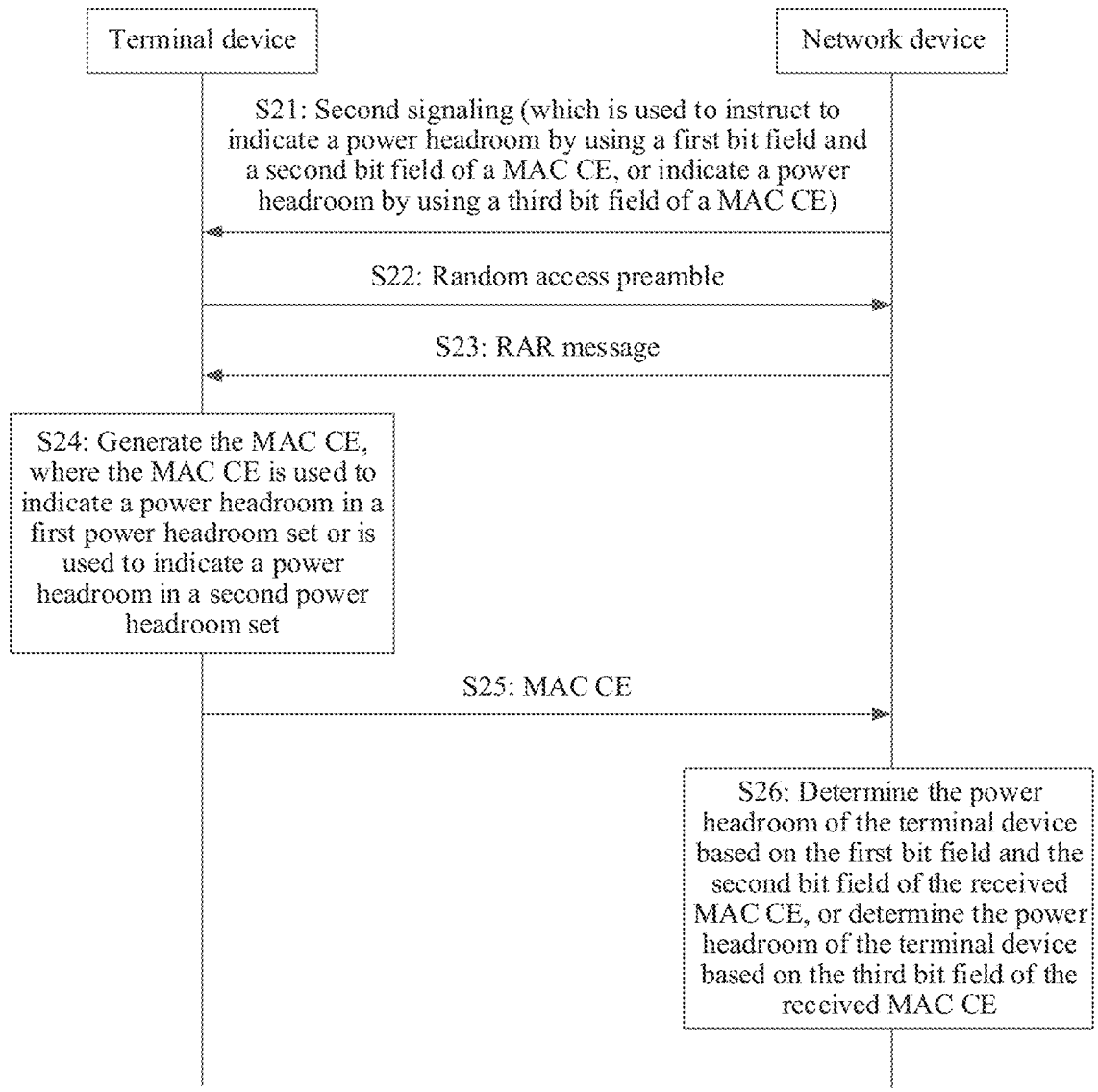
FIG. 2 is a flowchart of a first signal sending and receiving method according to an embodiment of this application.

Referring to FIG. 2, a procedure of the first signal sending and receiving method is described as follows.

S21: The network device sends second signaling to the terminal device, and the terminal device receives the second signaling from the network device. The second signaling is used to instruct to indicate a power headroom of the terminal device by using a third bit field included in a MAC CE, or the second signaling is used to instruct to indicate a power headroom of the terminal device by using a first bit field and a second bit field included in a MAC CE.

It may be understood as that the second signaling is used to notify the terminal device that the network device supports using or needs to use a new power headroom table. The following uses the first power headroom table as an example. Alternatively, it may be understood as that the second signaling is used to instruct the terminal device to use the first power headroom table when sending the power headroom to the network device.

For example, the second signaling may be sent through broadcast.

S22: The terminal device sends a random access preamble to the network device, and the network device receives the random access preamble from the terminal device. It may be considered that in S22, a random access process starts.

S23: The network device sends an RAR message to the terminal device, and the terminal device receives the RAR message from the network device.

The RAR message may carry a transmission resource of msg3 that is indicated by the network device.

S24: The terminal device generates the MAC CE, where the MAC CE is used to indicate a power headroom in a first power headroom set or indicate a power headroom in a second power headroom set. The first power headroom set is the power headroom table shown in Table 1, and the second power headroom set may be understood as the first power headroom table.

In S21, the network device has indicated that the network device supports using or needs to use the new power headroom table, and the terminal device knows capability information of the terminal device. If the capability information of the terminal device indicates that the terminal device also supports using the new power headroom table, when the terminal device indicates the power headroom of the terminal device to the network device, the terminal device can use the new power headroom table, for example, the first power headroom table.

The terminal device may perform physical layer measurement to obtain the power headroom of the terminal device, and then determine, with reference to the first power headroom table, a power headroom level to which the power headroom of the terminal device belongs in the first power headroom table. For example, the power headroom of the terminal device that is measured by the terminal device is a first power headroom, and the terminal device determines, with reference to the first power headroom table, that the first power headroom belongs to a first power headroom level in the first power headroom table. In this case, the terminal device needs to send the first power headroom level to the network device.

In an example, if the MAC CE is used to indicate the power headroom in the first power headroom set, the MAC CE includes the first bit field and the second bit field, the first bit field is a reserved bit field, and the second bit field is used to indicate the power headroom in the first power headroom set.

Figure 3:
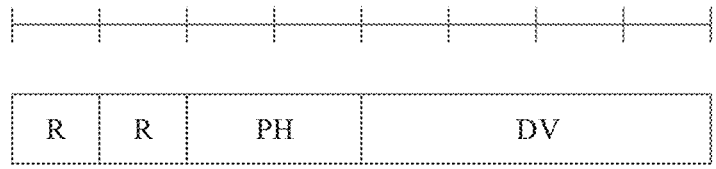
FIG. 3 is a schematic diagram of a MAC CE included in msg3.

Specifically, the MAC CE generated by the terminal device may include the first bit field and the second bit field. The second bit field is a bit field that is in the MAC CE and that is originally used to indicate a power headroom, and the first bit field is the reserved bit field. Reference may be made to FIG. 3. FIG. 3 shows an example of the MAC CE carried in msg3. A bit field represented by PH in FIG. 3 is used to indicate the power headroom of the terminal device, in other words, is used to indicate the power headroom level to which the power headroom of the terminal device belongs. R represents reservation (reserved), that is, a reserved bit, or referred to as a reserved bit field. DV is used to indicate a data volume. In addition, in FIG. 3, small grids are further evenly divided above the blocks. One small grid represents 1 bit. For example, the bit field represented by PH includes 2 bits, and one reserved bit includes 1 bit. In this case, in FIG. 3, the second bit field may include the bit field represented by PH, and the first bit field may include the bit field represented by R. In FIG. 3, there are two bit fields represented by R. In this case, the first bit field may include at least one of the two bit fields represented by R. If the terminal device indicates the power headroom of the terminal device by using the first power headroom set, that is, the terminal device needs to indicate the power headroom in the first power headroom set, the terminal device may generate the MAC CE shown in FIG. 3, and indicate the power headroom in the first power headroom set by using the second bit field.

Figure 4:
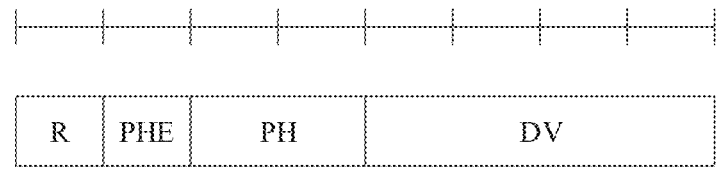
FIG. 4 is a schematic diagram of a MAC CE that can indicate a power headroom according to an embodiment of this application.

In addition, FIG. 4 shows an example of the MAC CE generated by the terminal device in this embodiment of this application. In FIG. 4, DV is used to represent a data volume, R represents a reserved bit, the second bit field includes a bit field represented by PH, and the first bit field includes a bit field represented by PHE. It can be learned that, in FIG. 4, one original bit field represented by R in the MAC CE is used as the PHE bit field, and the PHE bit field and the PH bit field in FIG. 4 may be used to jointly indicate the power headroom of the terminal device. In other words, in FIG. 4, 3 bits can be used to indicate the power headroom of the terminal device. Compared with an original case in which 2 bits are used to indicate the power headroom of the terminal device, a quantity of bits used to indicate the power headroom increases. In addition, in FIG. 4, an example in which one of the original reserved bits is used with the PH bit field to jointly indicate the power headroom of the terminal device is used. This is not limited in actual application. For example, alternatively, the original two reserved bits may be used with the PH bit field to jointly indicate the power headroom of the terminal device. That is, 4 bits are used to indicate the power headroom of the terminal device. This is not limited in this embodiment of this application. If the terminal device indicates the power headroom of the terminal device by using the second power headroom set, that is, the terminal device needs to indicate the power headroom in the second power headroom set, the terminal device may generate the MAC CE shown in FIG. 4, to jointly indicate the power headroom in the first power headroom set by using the first bit field and the second bit field. In this case, the first bit field and the second bit field are two bit fields, and the terminal device jointly indicates the power headroom of the terminal device by using the two bit fields.

Because the first power headroom table provided in this embodiment of this application includes at least five entries, more bits are needed to indicate the power headroom levels included in the first power headroom table. Therefore, in this embodiment of this application, an originally unused bit field in the MAC CE is used with the first bit field, in the MAC CE, that is originally used to indicate the power headroom level, to jointly indicate the power headroom. In this case, a quantity of power headroom levels that can be indicated correspondingly increases, and a quantity of power headrooms included in each power headroom level decreases. In this way, a reporting granularity is reduced, and accuracy of the power headroom of the terminal device that is determined by the network device is improved.

In another example, if the MAC CE is used to indicate the power headroom in the second power headroom set, the MAC CE includes a third bit field, the third bit field is used to indicate the power headroom in the second power headroom set, and the third bit field includes a bit of the first bit field and a bit of the second bit field.

When FIG. 4 is described above, an example in which the first bit field and the second bit field are two independent bit fields is used. Actually, the first bit field and the second bit field may alternatively be considered as one bit field, for example, referred to as the third bit field. It may be understood as that after the first power headroom table provided in this embodiment of this application is used, the third bit field may be used to indicate the power headroom of the terminal device. The third bit field includes a first bit part and a second bit part, where the second bit part is the bit, in the MAC CE, that is originally used to indicate the power headroom, and the first bit part is the original reserved bit in the MAC CE. It may be understood as that the third bit field includes the bit of the first bit field and the bit of the second bit field, or it may be understood as that the third bit field includes the original first bit field and the original second bit field, and the first bit field and the second bit field are combined into one bit field. FIG. 4 is used as an example. According to this understanding, the third bit field includes a bit represented by PHE and a bit represented by PH in FIG. 4. The bit represented by PH is the second bit part, and the bit represented by the PHE is the first bit part. If the terminal device indicates the power headroom of the terminal device by using the second power headroom set, that is, the terminal device needs to indicate the power headroom in the second power headroom set, the terminal device may generate the MAC CE shown in FIG. 4, and indicate the power headroom in the first power headroom set by using the third bit field. If the second power headroom set is used to indicate the power headroom of the terminal device, the terminal device may be configured to indicate the power headroom of the terminal device by directly using the third bit field. In other words, the terminal device may not perceive that the third bit field actually includes two original bit fields. Therefore, this understanding manner is relatively suitable for specific implementation of the terminal device. Certainly, this is only a different way of understanding, and the essence of the solution is not changed.

S25: The terminal device sends the MAC CE to the network device, and the network device receives the MAC CE from the terminal device.

In this embodiment of this application, the terminal device may add the MAC CE to msg3 and send msg3 to the network device, and the network device receives msg3 from the terminal device, and can obtain the MAC CE by parsing msg3.

As described above, this embodiment of this application provides the first power headroom table, and the power headroom of the terminal device that is sent by the terminal device is determined based on the first power headroom table. In this case, the network device also needs to determine, based on the first power headroom table, the power headroom sent by the terminal device. Currently, there is already a power headroom table, that is, the power headroom table shown in Table 1, and this embodiment of this application further provides the first power headroom table. Although the network device notifies the terminal device in S21 that the network device supports reporting the power headroom by using the first bit field and the second bit field, in other words, the network device supports using the first power headroom table, considering a terminal device capability, not all terminal devices can use the first power headroom table. For example, some terminal devices of old versions may be capable of using only the power headroom table shown in Table 1. Therefore, the network device needs to know a power headroom table that is actually used by the terminal device, and the terminal device needs to notify the network device of the used power headroom table.

In this embodiment of this application, a manner in which the terminal device indicates the used power headroom table to the network device includes but is not limited to the following manners:

Manner a: Indicate the power headroom table by using the MAC CE.

For example, the MAC CE further includes a fourth bit field. If the MAC CE is used to indicate the power headroom in the first power headroom set, the fourth bit field is a reserved bit field in the MAC CE; or if the MAC CE is used to indicate the power headroom in the second power headroom set, the fourth bit field is used to indicate that the power headroom is indicated by using the third bit field. It may be understood as that the fourth bit field is the reserved bit field in the MAC CE. However, if the MAC CE is used to indicate the power headroom in the second power headroom set, the fourth bit field may be used, to indicate that the power headroom is indicated by using the third bit field.

FIG. 4 is still used as an example. In FIG. 4, one of the two original reserved bit fields is used with the original PH bit field to jointly indicate the power headroom of the terminal device, the remaining reserved bit field (namely, the bit field represented by R in FIG. 4) in the original two reserved bit fields may be used to indicate a power headroom table to which the power headroom indicated by the MAC CE belongs, and the remaining reserved bit field may be used as the fourth bit field. For example, power headroom tables that can be used by the terminal device includes the power headroom table shown in Table 1 and the first power headroom table provided in this embodiment of this application, and a value of 1 bit included in the bit field represented by R in FIG. 4 may be used to indicate the power headroom table. For example, if the value of the bit is "1", it indicates that the power headroom table to which the power headroom indicated by the MAC CE belongs is the first power headroom table; and if the value of the bit is "0", it indicates that the power headroom table to which the power headroom indicated by the MAC CE belongs is the power headroom table shown in Table 1. Certainly, a relationship between the value of the bit and the indicated power headroom table is merely an example, and is not limited thereto.

In Manner a, both the power headroom of the terminal device and the power headroom table to which the power headroom belongs may be indicated in the MAC CE, and no additional resource is required for indication, so that transmission resources can be saved.

Manner b: Indicate the power headroom table by using first signaling.

For example, the first signaling is RRC signaling. In this case, the terminal device may send the RRC signaling to the network device, and the network device receives the RRC signaling from the terminal device. The RRC signaling may be used to indicate the power headroom table to which the power headroom of the terminal device that is indicated by the terminal device in the MAC CE belongs. Alternatively, it may be understood as that the RRC signaling is used to indicate that the power headroom is indicated by using the third bit field, or the RRC signaling is used to indicate that the power headroom is indicated by using the first bit field and the second bit field.

For example, the terminal device indicates, in the RRC signaling of msg3, the power headroom table to which the power headroom of the terminal device that is indicated in the MAC CE belongs. An indication form in the RRC signaling may be explicit indication, or may be implicit indication. For example, the power headroom table is indicated by indicating a version number of the terminal device.

In Manner b, there may be more bits that can be used to indicate the power headroom table in the RRC signaling, and this manner is more applicable to a case in which there are more power headroom tables.

Manner c: Indicate the power headroom table by using a logical channel number of a channel.

For example, the terminal device adds the MAC CE into msg3, and sends, to the network device through a common control channel (CCCH), msg3 that carries the MAC CE. In this case, the network device receives msg3 from the terminal device through the CCCH. The CCCH may be considered as unchanged, but one CCCH may have a plurality of logical channel identifiers. Therefore, the logical channel identifiers of the CCCH may be used to indicate different msg3. The different msg3 herein refers to msg3 carrying different MAC CEs. When different power headroom tables are used, it is considered that MAC CEs are different. It may be understood as that the logical channel identifiers of the CCCH may be used to indicate different power headroom tables. Alternatively, it may be understood as that the logical channel identifier of the CCCH is used to indicate that the power headroom is indicated by using the third bit field, or the logical channel identifier of the CCCH is used to indicate that the power headroom is indicated by using the first bit field and the second bit field.

For example, the terminal device adds the generated MAC CE into msg3, and sends msg3 to the network device through the CCCH. If the power headroom table to which the power headroom of the terminal device that is indicated by the MAC CE belongs is the first power headroom table, the logical channel identifier of the CCCH may a first identifier; or if the power headroom table to which the power headroom of the terminal device that is indicated by the MAC CE belongs is the power headroom table shown in Table 1, the logical channel identifier of the CCCH may be a second identifier. That is, either of the first identifier and the second identifier can be used to indicate the power headroom table to which the power headroom of the terminal device that is indicated by the MAC CE belongs.

Regardless whether the power headroom table is indicated in Manner b or Manner c, no bit in the MAC CE needs to be occupied to indicate the power headroom table, and the reserved bit field in the MAC CE may be used with the PH field to jointly indicate the power headroom of the terminal device. This extends a range of the power headroom that can be sent by using msg3, and a power headroom of a finer granularity may be reported.

In a specific implementation process, Manner a, Manner b, or Manner c may be randomly selected to indicate the power headroom table, or the network device may configure which of Manner a, Manner b, or Manner c is specifically used to indicate the power headroom table, or a protocol may specify which of Manner a, Manner b, or Manner c is specifically used to indicate the power headroom table. This is not specifically limited.

S26: The network device determines the power headroom of the terminal device based on the second bit field in the received MAC CE, or the network device determines the power headroom of the terminal device based on the third bit field in the received MAC CE.

If the MAC CE is used to indicate the power headroom in the first power headroom set, the network device determines the power headroom in the first power headroom set based on the second bit field included in the MAC CE, where the MAC CE includes the first bit field and the second bit field, and the first bit field is the reserved bit field: or if the MAC CE is used to indicate the power headroom in the second power headroom set, the network device determines the power headroom in the second power headroom set based on the third bit field included in the MAC CE, where the third bit field includes the bit of the first bit field and the bit of the second bit field.

Alternatively, if the MAC CE is used to indicate the power headroom in the first power headroom set, the network device determines the power headroom in the first power headroom set based on the second bit field, where the first bit field is the reserved bit field; or if the MAC CE is used to indicate the power headroom in the second power headroom set, the network device determines the power headroom in the second power headroom set based on the first bit field and the second bit field.

Actually, the terminal device actually indicates, by using the MAC CE, the power headroom level to which the power headroom of the terminal device belongs. After determining the power headroom table, the network device can determine the power headroom of the terminal device by performing matching between the determined power headroom table and the power headroom level indicated by the terminal device by using the MAC CE.

Specifically, if the MAC CE includes the first bit field and the second bit field, the first bit field is the reserved bit field, and the second bit field is used to indicate the power headroom in the first power headroom set, the network device can determine the power headroom level of the terminal device based on the second bit field, and then can finally determine the power headroom of the terminal device based on the first power headroom set.

Alternatively, if the MAC CE includes the first bit field and the second bit field, and the first bit field and the second bit field are used to jointly indicate the power headroom in the second power headroom set, the network device can determine the power headroom level of the terminal device based on the first bit field and the second bit field, and then can finally determine the power headroom of the terminal device based on the second power headroom set.

Alternatively, if the MAC CE includes the third bit field, and the third bit field is used to jointly indicate the power headroom in the second power headroom set, the network device can determine the power headroom level of the terminal device based on the third bit field, and then can finally determine the power headroom of the terminal device based on the second power headroom set.

If the terminal device indicates the power headroom table in Manner a described in S25, the network device determines, based on the MAC CE, the power headroom table to which the power headroom of the terminal device belongs. If the terminal device indicates the power headroom table in Manner b described in S25, the network device may determine, based on the received RRC signaling, the power headroom table to which the power headroom of the terminal device that is indicated by the MAC CE belongs. If the terminal device indicates the power headroom table in Manner c described in S25, the network device may determine, based on the logical channel number of the CCCH carrying msg3, the power headroom table to which the power headroom of the terminal device that is indicated by the MAC CE belongs.

In the procedure shown in FIG. 2, S21 to S23 are optional steps and are not mandatory.

In this embodiment of this application, the PHR may be re-divided into more power headroom levels than the four power headroom levels in Table 1. When the value range of the power headroom of the terminal device remains unchanged, the first power headroom table provided in this embodiment of this application can provide a finer division granularity, so that the power headroom values included in each power headroom level are fewer than those in the current Table 1. In addition, in this embodiment of this application, more bits are provided to indicate the power headroom of the terminal device, to adapt to the newly provided power headroom table. In this way, a reporting granularity is reduced, and the terminal device can report a more precise power headroom. The network device can correspondingly perform more accurate power control on the terminal device, so that the terminal device can send data by using proper power. This avoids power waste and properly avoids interference to a network while ensuring transmission quality. In addition, in this embodiment of this application, the terminal device still indicates the power headroom of the terminal device when sending msg3 to the network device, and an existing procedure for indicating the power headroom of the terminal device may be reused to some extent. This has little impact on the current procedure, and is more compatible with the prior art.

In addition, as described above, currently, the terminal device cannot report the power headroom after the power headroom changes in a data transmission process. In other words, currently, the terminal device cannot report the power headroom when being in a connected state, resulting in poor uplink power control performance. In view of this, an embodiment of this application provides a second signal sending and receiving method, to resolve a problem that the terminal device cannot report the power headroom when being in the connected state. In addition, in the second signal sending and receiving method, that the terminal device indicates the power headroom of the terminal device to the network device may also be understood as that the terminal device indicates, to the network device, the power headroom level to which the power headroom of the terminal device belongs, or that the terminal device indicates the power headroom of the terminal device to the network device may be understood as being implemented by indicating, to the network device, the power headroom level to which the power headroom of the terminal device belongs.

In the second signal sending and receiving method, this embodiment of this application may also provide at least one new power headroom table. The following mainly uses an example in which one new power headroom table is provided. In actual application, a quantity of new power headroom tables is not limited. For example, the new power headroom table provided in this embodiment of this application is referred to as a second power headroom table, and the second power headroom table may also be understood as a second power headroom set. The second power headroom table includes at least five entries. For a form of each entry, refer to a form of any entry in Table 1. Similarly, each entry represents a power headroom level. To be specific, in this embodiment of this application, the PHR may be re-divided into more power headroom levels than the four power headroom levels in Table 1, and each power headroom level may also correspond to a plurality of specific power headroom values. However, compared with the power headroom table shown in Table 1, a quantity of power headroom values corresponding to each of the at least one power headroom level included in the second power headroom table is less than the quantity of power headroom values corresponding to the power headroom level included in the power headroom table shown in Table 1. In this case, when a value range of the power headroom of the terminal device remains unchanged, the second power headroom table provided in this embodiment of this application can provide a finer division granularity, so that the power headroom values included in each power headroom level are fewer than those in the current Table 1. In this way, the reporting granularity is reduced, so that accuracy of the power headroom of the terminal device that is determined by the network device is improved. The second power headroom table and the first power headroom table provided in the embodiment shown in FIG. 2 may be a same power headroom table, or may be different power headroom tables. This is not limited in this embodiment of this application. If this embodiment of this application provides a plurality of power headroom tables, power headroom levels included in different power headroom tables may be different, or power headroom levels included in at least two of the power headroom tables may partially overlap. In addition, the power headroom levels included in the power headroom table provided in this embodiment of this application and the power headroom levels included in the power headroom table shown in Table 1 may be different, or may partially overlap.

However, in the second signal sending and receiving method, a specific used power headroom table is not limited. For example, the terminal device may use the second power headroom table, or may continue to use the power headroom table shown in Table 1.

Figure 5:
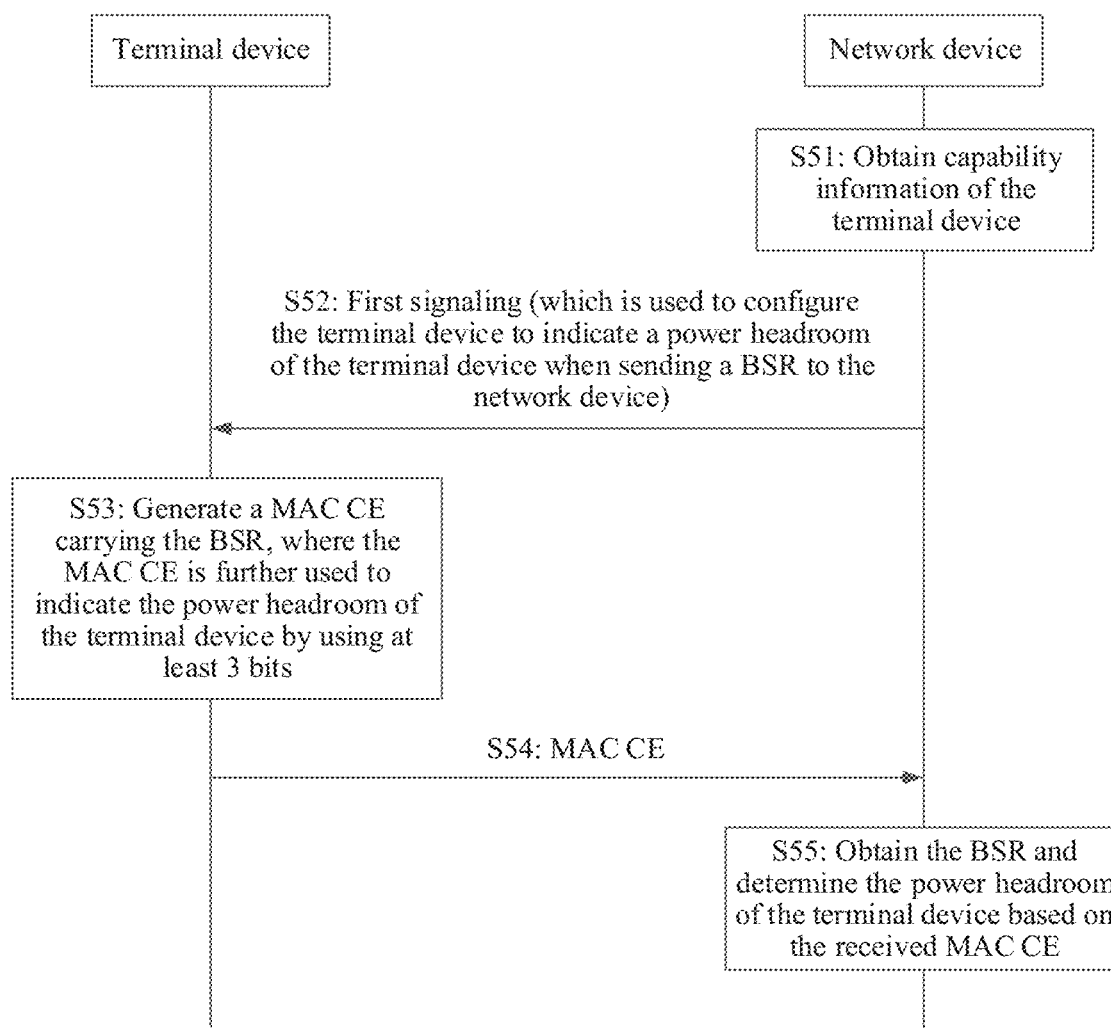
FIG. 5 is a flowchart of a second signal sending and receiving method according to an embodiment of this application.

Referring to FIG. 5, a procedure of the second signal sending and receiving method is described as follows.

S51: A network device obtains capability information of a terminal device.

In this embodiment of this application, the capability information of the terminal device may be used to indicate whether the terminal device supports extended power headroom reporting. It may be understood as that the capability information of the terminal device may be used to indicate whether the terminal device supports triggering power headroom reporting while triggering a buffer status report (BSR).

In other words, in the embodiment shown in FIG. 5, the terminal device indicates a power headroom of the terminal device while sending the BSR to the network device. When the terminal device sends the BSR to the network device, the terminal device usually needs to send uplink data. In this case, the power headroom of the terminal device is also indicated to the network device. This helps the network device perform uplink power control, so that an occasion for indicating the power headroom to the network device is relatively good.

A manner in which the network device obtains the capability information of the terminal device includes but is not limited to the following several manners:

Manner 1: Obtain the capability information by using a random access process.

For example, in the random access process, the terminal device sends a random access preamble to the network device, and the network device receives the random access preamble from the terminal device. Then, the network device sends an RAR message to the terminal device, where the RAR message may carry a transmission resource of msg3, and the terminal device receives the RAR message from the network device. Then, the terminal device sends msg3 to the network device. In msg3, the capability information of the terminal device may be indicated, and the capability information of the terminal device may indicate whether the terminal device supports triggering power headroom reporting while triggering the BSR. In this case, the network device receives msg3 from the terminal device, and can obtain the capability information of the terminal device by parsing msg3, so as to determine whether the terminal device supports triggering power headroom reporting while triggering the BSR.

In Manner 1, the network device may directly obtain the capability information of the terminal device from the terminal device, so that the obtained capability information of the terminal device is relatively accurate. In addition, the capability information of the terminal device may be obtained by using the random access process, and the terminal device does not need to additionally send other information, thereby saving transmission resources.

Manner 2: Obtain the capability information by using a core network device.

For example, the network device may send a request message to the core network device, where the request message is used to request to obtain the capability information of the terminal device. For example, the request message may carry an identity (ID) of the terminal device. After receiving the request message from the network device, the core network device may query for the capability information of the terminal device, and send the capability information of the terminal device to the network device. In this case, the network device can receive the capability information of the terminal device from the core network device, to determine whether the terminal device supports triggering power headroom reporting while triggering the BSR. The core network device is, for example, a mobility management entity (MME). This is not specifically limited.

In Manner 2, the network device can obtain the capability information of the terminal device without interacting with the terminal device. This reduces interaction processes or an amount of exchanged data on an air interface, and can save air interface transmission resources.

In a specific implementation process, Manner 1 or Manner 2 may be randomly selected to obtain the capability information of the terminal device, or a protocol may specify which of Manner 1 or Manner 2 is specifically used to obtain the capability information of the terminal device. This is not specifically limited.

S52: The network device sends first signaling to the terminal device, and the terminal device receives the first signaling from the network device, where the first signaling is used to configure the terminal device to indicate the power headroom of the terminal device while sending the BSR to the network device.

The network device obtains the capability information of the terminal device in S51. If the capability information of the terminal device indicates that the terminal device can support indicating the power headroom of the terminal device while sending the BSR to the network device, the network device may send the first signaling to the terminal device, to configure the terminal device to indicate the power headroom of the terminal device while sending the BSR to the network device.

S53: The terminal device generates a MAC CE carrying the BSR, where the MAC CE is further used to indicate the power headroom of the terminal device by using at least 3 bits.

In this embodiment of this application, the terminal device may use the power headroom table shown in Table 1, or may use the new power headroom table. A specific power headroom to be used may be specified in a protocol, or may be configured by the network device. In the two cases, the terminal device does not need to additionally indicate the used power headroom table to the network device. Alternatively, the protocol does not specify the power headroom table to be used, and the network device does not configure the power headroom table to be used. In this case, the terminal device may indicate the used power headroom table by using the MAC CE, or the terminal device may indicate the used power headroom table by using additional signaling, for example, by using RRC signaling. For a specific implementation, refer to related descriptions in the embodiment shown in FIG. 2. Details are not described.

For an example of the MAC CE generated by the terminal device in S53, refer to FIG. 6. In FIG. 6, an LCG ID represents a logical channel number, a bit field represented by BSR is used to carry the BSR, a bit field represented by PH is used to indicate the power headroom of the terminal device, and R represents a reserved bit, or referred to as a reserved bit field. It may be visually understood as that, in FIG. 6, the first row of blocks is used to carry the BSR, and the second row of blocks is used to indicate the power headroom of the terminal device. In addition, in FIG. 6, small grids are further evenly divided above the blocks. One small grid may represent 1 bit. For example, the bit field represented by PH includes 4 bits, and one reserved bit includes 1 bit. If the terminal device separately sends the BSR and indicates the power headroom of the terminal device by using different MAC CEs, each MAC CE needs to include a subheader and the subheader also needs to occupy a transmission resource. However, if the terminal device sends the BSR and indicates the power headroom of the terminal device by using one MAC CE, as shown in FIG. 6, the MAC CE needs to include only one subheader (which is not shown in FIG. 6). This reduces a quantity of subheaders, and saves transmission resources.

FIG. 6 is used as an example. If the terminal device uses the power headroom table shown in Table 1, the PH bit field shown in FIG. 6 may be used to indicate the power headroom of the terminal device, and at least 2 bits in the MAC CE are used to indicate the power headroom of the terminal device. If the terminal device uses the second power headroom table, the PH bit field shown in FIG. 6 may be used to indicate the power headroom of the terminal device. Alternatively, if the second power headroom table includes more power headroom levels, the PH bit field and at least one reserved bit field shown in FIG. 6 may be used to jointly indicate the power headroom of the terminal device. A specific quantity of reserved bit fields used with the PH bit field to jointly indicate the power headroom of the terminal device is related to a quantity of power headroom levels included in the second power headroom table. In conclusion, if the terminal device uses the second power headroom table, at least 3 bits in the MAC CE are used to indicate the power headroom of the terminal device. For example, if the quantity of power headroom levels included in the second power headroom table is 32, the PH bit field includes 4 bits. In this case, the PH bit field and one of the reserved bit fields may be used to jointly indicate the power headroom of the terminal device, that is, 5 bits are used to indicate the power headroom of the terminal device, so that the 32 power headroom levels can be indicated. The reserved bit field used with the PH bit field to jointly indicate the power headroom of the terminal device may be adjacent to or not adjacent to the PH bit field in FIG. 6. This is not specifically limited.

S54: The terminal device sends the MAC CE to the network device, and the network device receives the MAC CE from the terminal device.

S55: The network device determines the power headroom of the terminal device based on the at least 3 bits included in the MAC CE, and obtains the BSR from the MAC CE.

The network device can obtain, by parsing the MAC CE, the BSR and the power headroom level that is indicated by the terminal device. After determining the power headroom table, the network device can determine the power headroom of the terminal device by performing matching between the determined power headroom table and the power headroom level indicated by the terminal device by using the MAC CE.

If the terminal device determines, by using a protocol specification, the power headroom table to be used, the network device also determines the used power headroom table by using the protocol specification. Alternatively, if the terminal device determines, by using a configuration of the network device, the power headroom table to be used, the network device can determine the used power headroom table based on the configuration on the terminal device. Alternatively, if the terminal device indicates the power headroom table by using the MAC CE, the network device determines, based on the MAC CE, the power headroom table to which the power headroom of the terminal device belongs. If the terminal device indicates the power headroom table by using the RRC signaling, the network device can determine, based on the received RRC signaling, the power headroom table to which the power headroom of the terminal device that is indicated by the MAC CE belongs.

When being in a connected state, the terminal device may have more opportunities to send the BSR to the network device. In this case, the terminal device may indicate a power headroom of the terminal device each time the terminal device sends the BSR. Alternatively, because the power headroom of the terminal device may not continuously change, the terminal device may not need to continuously indicate the power headroom to the network device. Continuously indicating the power headroom may even cause some interference to the network device and consume additional signaling overheads. Therefore, this embodiment of this application further provides a determining mechanism. The terminal device may determine, by using the determining mechanism, whether to indicate the power headroom of the terminal device to the network device. This can effectively avoid frequent reporting of the power headroom.

For example, the determining mechanism includes but is not limited to at least one of the following. When at least one of the following is met, the terminal device generates the MAC CE. In other words, when at least one of the following is met, the terminal device may indicate the power headroom to the network device while sending the BSR:

a difference between a first downlink path loss of the terminal device and a second downlink path loss of the terminal device is greater than a first threshold, where the first downlink path loss is a current downlink path loss of the terminal device, and the second downlink path loss is a downlink path loss caused when the terminal device last indicates a power headroom of the terminal device to the network device;

a difference between the current power headroom of the terminal device and a first power headroom of the terminal device is greater than a second threshold, where the first power headroom is a power headroom last sent by the terminal device to the network device;

the first downlink path loss of the terminal device is greater than a third threshold, where the first downlink path loss is the current downlink path loss of the terminal device; and the current power headroom of the terminal device is greater than a fourth threshold.

The first threshold, the second threshold, the third threshold, and the fourth threshold may be defined by using a protocol, or may be configured by the network device for the terminal device.

It can be learned that the determining mechanism is relatively flexible. In actual application, one or more determining mechanisms may be randomly selected for determining, or which one or more determining mechanisms are specifically selected may be specified in a protocol, or which one or more determining mechanisms are specifically selected may be configured by the network device. In addition, the foregoing determining mechanisms are merely examples. In a specific application, there may be another determining mechanism. This is not specifically limited.

In the procedure shown in FIG. 5, S51 and S52 are optional steps and are not mandatory.

In this embodiment of this application, the PHR may be re-divided into more power headroom levels than the four power headroom levels in Table 1. When a value range of the power headroom of the terminal device remains unchanged, the first power headroom table provided in this embodiment of this application can provide a finer division granularity, so that the power headroom values included in each power headroom level are fewer than those in the current Table 1. In addition, in this embodiment of this application, more bits are provided to indicate the power headroom of the terminal device, to adapt to the newly provided power headroom table. In this way, a reporting granularity is reduced, and the terminal device can report a more precise power headroom. The network device can correspondingly perform more accurate power control on the terminal device, so that the terminal device can send data by using proper power. This avoids power waste and properly avoids interference to a network while ensuring transmission quality. In addition, in this embodiment of this application, the terminal device may indicate the power headroom of the terminal device to the network device when being in the connected state. For example, if the power headroom of the terminal device changes in a data transmission process, the terminal device may indicate the power headroom of the terminal device to the network device in the manner provided in this embodiment of this application, to improve uplink power control performance. In addition, the terminal device may add the power headroom of the terminal device and the BSR into one MAC CE for sending. This helps reduce signaling overheads.

In both the embodiment shown in FIG. 2 and the embodiment shown in FIG. 5, an example in which the terminal device indicates the power headroom of the terminal device to the network device is used. Actually, in the embodiment shown in FIG. 2, in addition to indicating the power headroom of the terminal device to the network device by using msg3, the terminal device may further transmit other information to the network device. For example, the terminal device may transmit downlink interference information of the terminal device to the network device by using at least one reserved bit field of msg3 or the MAC CE in msg3. Similarly, in the embodiment shown in FIG. 5, when being in the connected state, in addition to indicating the power headroom of the terminal device and the BSR to the network device by using the MAC CE, the terminal device may further transmit other information to the network device. For example, the terminal device may transmit downlink interference information of the terminal device to the network device by using the MAC CE. Specifically, in both the embodiment shown in FIG. 2 and the embodiment shown in FIG. 5, indicating the power headroom to the network device is merely an example, and specific information sent to the network device is not limited.

In the embodiment shown in FIG. 2 or the embodiment shown in FIG. 5, the terminal device may indicate the power headroom of the terminal device by using more bits, to reduce a reporting granularity. This resolves a technical problem that the power headroom of the terminal device that is determined by the network device is not sufficiently accurate, and improves accuracy of the power headroom of the terminal device that is determined by the network device. Another technical problem is described below.

In an existing random access procedure, a terminal device is allowed to transmit only basic information for connection establishment and the like, and a network device schedules only very few resources, for example, 88 bits, to transmit msg3. Therefore, the resources allocated to msg3 can support transmitting a very small amount of data. Therefore, in a currently discussed enhanced version of NB-ioT, a proper amount of uplink data is transmitted in msg3 in the random access process. This is a data early transmission procedure. In this way, the terminal device can transmit some data to the network device in a relatively timely manner, and does not need to wait to transmit the data after a connection is established. Therefore, the network device may allocate more uplink resources to the terminal device for transmitting msg3, and the terminal device may transmit more uplink data in msg3.

For this new feature, the terminal device may report some information in msg3. However, compared with normal data, the information reported by the terminal device usually has a relatively small data amount. Once the data early transmission procedure is used, the network device cannot predict a transmission purpose of the terminal device, and allocates, based on a typical uplink data amount, an uplink resource of at least hundreds of bits to the terminal device for transmitting msg3, but the terminal device may need to use only very few resources to transmit the information that needs to be transmitted. Therefore, for a remaining resource, the terminal device needs to add padding bits. In other words, if a data early transmission mechanism is used, the terminal device adds a large quantity of padding bits for reporting a small amount of information, and power consumption of the terminal device is relatively high.

In view of this, an embodiment of this application provides a first resource determining method. According to the method, some information can be reported by using the data early transmission mechanism, and the terminal device does not need to add a large quantity of padding bits. This helps reduce power consumption of the terminal device.

Referring to FIG. 7, a procedure of the method is described as follows:

S71: A terminal device sends a random access preamble to a network device, and the network device receives the random access preamble from the terminal device.

Because a data early transmission mechanism is used, the terminal device may send the random access preamble to the network device on a reserved resource used for early data transmission, and the network device also receives the random access preamble from the terminal device on the reserved resource used for early data transmission.

S72: The terminal device obtains first resource information indicated by the network device, where the first resource information is used to send msg3, and the first resource information includes a parameter of a modulation and coding scheme (MCS) of msg3 and a parameter of a quantity of resource units (RU) used for msg3.

The terminal device obtains the first resource information indicated by the network device, for example, by using an RAR received from the network device. For example, the network device sends an RAR message to the terminal device, and the terminal device receives the RAR message from the network device. The RAR message may include one piece of uplink grant information (UL grant). The UL grant may indicate the first resource information. It may be understood as that the UL grant may be used to indicate the MCS used for msg3 and the S4 quantity of RUs used for msg3. The RU is a resource unit, and RUs may be different in different systems. The quantity of RUs may indicate a quantity of used resources. Therefore, S72 in FIG. 7 uses an example in which the terminal device obtains the first resource information by using the RAR received from the network device. In other words, S72 in FIG. 7 includes a process in which the network device sends the RAR to the terminal device and the terminal device receives the RAR from the network device, and further includes a process in which the terminal device obtains the first resource information by using the RAR.

A TBS that may be used to report or transmit data in msg3, and a mapping relationship between the TBS, the MCS, and the quantity of resource units are information preconfigured by the network device for the terminal device, or information that is standardized and fixed in a protocol. Therefore, after obtaining the MCS used for msg3 and the quantity of resource units used for msg3, the terminal device can determine, by looking up a table, a transport block size (TBS) indicated by the first resource information. For a specific table lookup manner, refer to the prior art. Alternatively, the first resource information may directly carry the MCS used for msg3, the quantity of resource units used for msg3, and the TBS used for msg3. In other words, the network device may directly indicate the TBS, and the terminal device does not need to look up a table.

S73: The terminal device determines second resource information based on a proper subset of the parameters included in the first resource information, where the second resource information is used by the terminal device to actually send msg3, a second transport block size is smaller than a first transport block size, the second transport block size is a transport block size, of msg3, included in the second resource information, and the first transport block size is a transport block size, of msg3, included in the first resource information.

As described above, because the data early transmission mechanism is used, the network device usually allocates more resources used to transmit msg3. In other words, the TBS indicated by the first resource information may be relatively large. For example, the terminal device needs to indicate a power headroom of the terminal device by using msg3. Indicating the power headroom does not actually need too many resources, and a TBS of an actually needed resource may be much smaller than the TBS indicated by the first resource information. Therefore, this embodiment of this application proposes that the terminal device may not perform an operation completely following instruction of the network device. For example, if the network device indicates two parameters: the MCS used for msg3 and the quantity of resource units used for msg3, the terminal device may finally determine the second resource information by using only one of the two parameters.

In a first example, the terminal device may use the MCS of msg3 that is indicated by the network device in the first resource information, and keeps the MCS unchanged but decreases the quantity of resource units based on the quantity of resource units that is indicated by the first resource information. The terminal device knows a TBS actually needed by the terminal device to transmit msg3. Therefore, the terminal device reselects, from TBSs that can be used to report or transmit data in msg3, a minimum TBS that is sufficient to transmit data that needs to be transmitted, to determine the second resource information.

In a second example, the terminal device may use the quantity of resource units of msg3 that is indicated by the network device in the first resource information, and keeps the quantity of resource units unchanged but reduces the MCS based on the MCS indicated by the first resource information. The terminal device knows a TBS actually needed by the terminal device to transmit msg3. Therefore, the terminal device reselects, from TBSs that can be used to report or transmit data in msg3, a minimum TBS that is sufficient to transmit data that needs to be transmitted.

It can be learned that regardless which of the foregoing first example or second example is used, the MCS, of msg3, included in the finally determined second resource information is the same as the MCS, of msg3, included in the first resource information, and the quantity of resource units, of msg3, included in the second resource information is less than the quantity of resource units, of msg3, included in the first resource information, and the TBS, of msg3, included in the second resource information is less than the TBS, of msg3, included in the first resource information. In other words, the terminal device uses only some resources indicated by the network device, and does not use a remaining resource. In addition, in this embodiment of this application, the terminal device does not use a resource corresponding to a third TBS. In other words, the terminal device does not need to add padding bits to the resource corresponding to the third TBS. The third TBS is a difference between the first TBS and the second TBS, the second TBS is the TBS, of msg3, included in the second resource information, the first TBS is the TBS, of msg3, included in the first resource information, and the resource corresponding to the third TBS may be understood as a remaining resource in the resources indicated by the first resource information other than the resource used by the terminal device to transmit the data that needs to be transmitted.

The foregoing first example and second example are merely two examples. In actual application, the first resource information may further include another parameter, and any solution in which the terminal device determines the second resource information by using the proper subset of the parameters included in the first resource information falls within the protection scope of the embodiments of this application.

S74: The terminal device transmits msg3 by using the resource indicated by the second resource information, and the network device receives msg3 from the terminal device by using the resource indicated by the second resource information.

After determining the second resource information, the terminal device may transmit msg3 by using the resource indicated by the second resource information. The network device actually indicates the first resource information to the terminal device, but the terminal device transmits msg3 by using only some resources in the resources indicated by the first resource information. However, the network device does not know the resources that are actually used by the terminal device. Therefore, the network device may still perform detection on all the resources indicated by the first resource information, to obtain msg3 sent by the terminal device.

S75: The network device obtains, based on the received msg3, the information sent by the terminal device.

For example, if the terminal device indicates the power headroom of the terminal device by using msg3, the network device can determine the power headroom of the terminal device by parsing msg3. For example, the terminal device actually indicates, by using msg3, a power headroom level to which the power headroom of the terminal device belongs, and the network device can determine the power headroom of the terminal device by performing matching between a corresponding power headroom table and the power headroom level indicated by the terminal device by using msg3.

In this embodiment of this application, the terminal device may indicate the power 51, headroom of the terminal device to the network device by using msg3. For a specific indication manner, refer to the descriptions of the embodiment shown in FIG. 2. Alternatively, the terminal device may transmit, to the network device by using msg3, other information such as downlink interference information of the terminal device, other data, or the like. Specific information transmitted by using msg3 is not limited.

S71, S74, and S75 in the embodiment shown in FIG. 7 are optional steps and are not mandatory.

It can be learned that in this embodiment of this application, the data early transmission procedure may be used. In addition, the terminal device may directly not use the redundant resources allocated by the network device, and does not need to add a large quantity of padding bits, so that the terminal device can reduce power consumption of the terminal device while transmitting the information to the network device.

In the embodiment shown in FIG. 7, the terminal device determines the second resource information by using the proper subset of the parameters included in the first resource information. The following describes a second resource determining method. The method can also resolve the problem that the terminal device needs to add a large quantity of padding bits when sending data to the network device by using the early data transmission mechanism. However, in this method, the terminal device may determine, in another manner, resource information used to actually transmit msg3.

Figure 8:
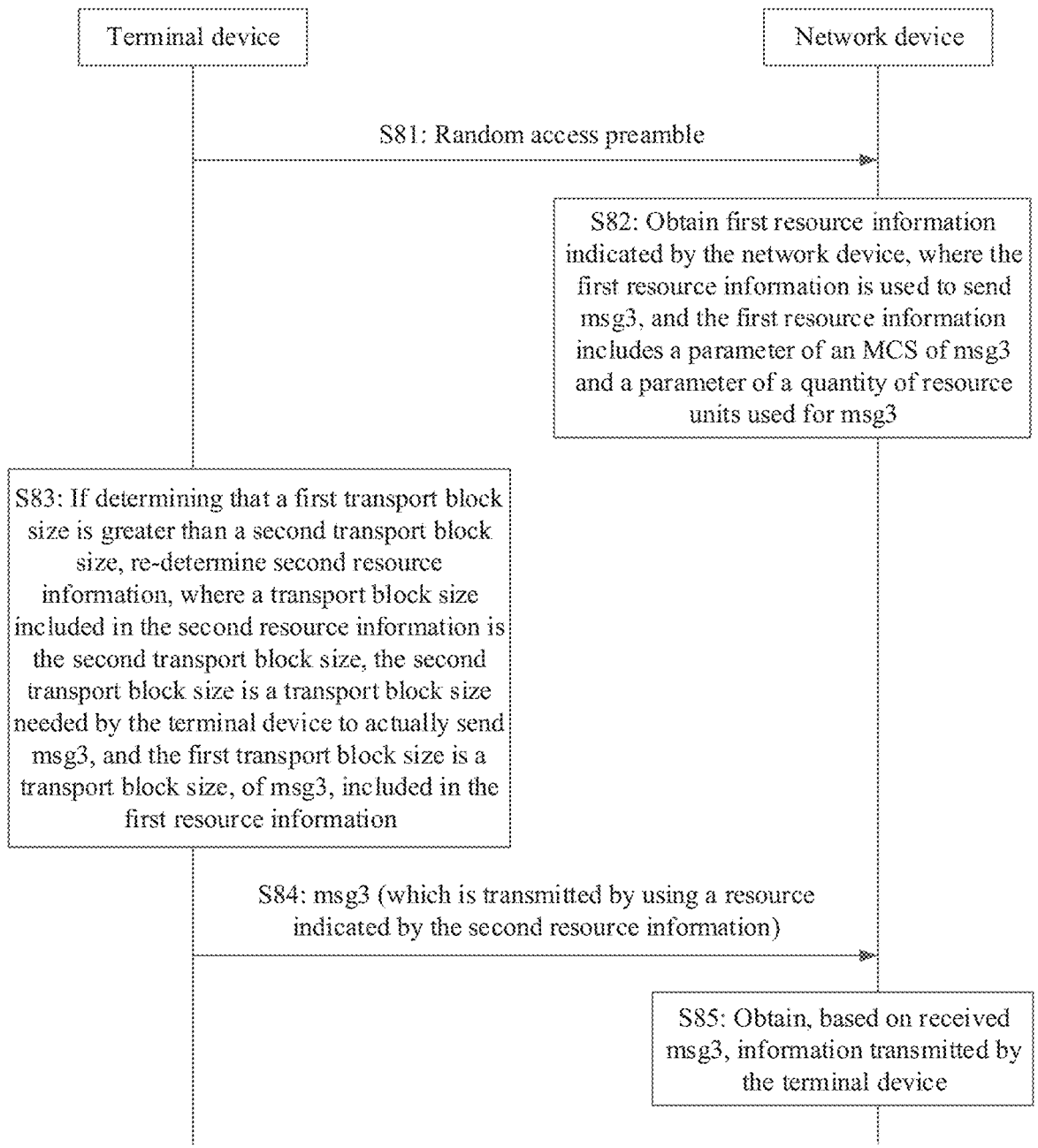
FIG. 8 is a flowchart of a second resource determining method according to an embodiment of this application.

Referring to FIG. 8, a procedure of the method is described as follows:

S81: A terminal device sends a random access preamble to a network device, and the network device receives the random access preamble from the terminal device.

Because a data early transmission mechanism is used, the terminal device may send the random access preamble to the network device on a reserved resource used for early data transmission, and the network device also receives the random access preamble from the terminal device on the reserved resource used for early data transmission.

S82: The terminal device obtains first resource information indicated by the network device, where the first resource information is used to send msg3, and the first resource information includes a parameter of an MCS of msg3 and a parameter of a quantity of resource units used for msg3.

The terminal device obtains the first resource information indicated by the network device, for example, by using an RAR received from the network device. For example, the network device sends an RAR message to the terminal device, and the terminal device receives the RAR message from the network device. The RAR message may include one UL grant. The UL grant may indicate the first resource information. It may be understood as that the UL grant may be used to indicate the MCS used for msg3 and the quantity of RUs used for msg3. The RU is a resource unit, and RUs may be different in different systems. The quantity of RUs may indicate a quantity of used resources. Therefore, S82 in FIG. 8 uses an example in which the terminal device obtains the first resource information by using the RAR received from the network device. In other words, S82 in FIG. 8 includes a process in which the network device sends the RAR to the terminal device and the terminal device receives the RAR from the network device, and further includes a process in which the terminal device obtains the first resource information by using the RAR.

A TBS that may be used to report or transmit data in msg3, and a mapping relationship between the TBS, the MCS, and the quantity of resource units are information preconfigured by the network device for the terminal device, or information that is standardized and fixed in a protocol.

Therefore, after obtaining the MCS used for msg3 and the quantity of resource units used for msg3, the terminal device can determine, by looking up a table, a TBS indicated by the first resource information. For a specific table lookup manner, refer to the prior art. Alternatively, the first resource information may directly carry the MCS used for msg3, the quantity of resource units used for msg3, and the TBS used for msg3. In other words, the network device may directly indicate the TBS, and the terminal device does not need to look up a table.

S83: If the terminal device determines that a first transport block size is greater than a second transport block size, the terminal device re-determines second resource information, where a transport block size included in the second resource information is the second transport block size. The second transport block size is a transport block size needed by the terminal device to actually send msg3, and the first transport block size is a transport block size, of msg3, included in the first resource information.

As described above, because the data early transmission mechanism is used, the network device usually allocates more resources used to transmit msg3. In other words, the TBS indicated by the first resource information may be relatively large. For example, the terminal device needs to indicate a power headroom of the terminal device by using msg3. Indicating the power headroom does not actually need too many resources, and a TBS of an actually needed resource may be much smaller than the TBS indicated by the first resource information. Therefore, this embodiment of this application proposes that the terminal device may perform an operation without following instruction of the network device. For example, if determining that the first TBS is greater than the second TBS, the terminal device may re-determine the second resource information provided that the TBS included in the determined second resource information is less than the first TBS.

For example, the terminal device may traverse all possible quantities of resource units less than or equal to the quantity that is of resource units of msg3 and that is indicated in the first resource information, and all possible MCSs less than or equal to the MCS indicated in the first resource information. Because one TBS may be determined based on each MCS and each quantity of resource units, the terminal may reselect, from all possible TBSs obtained through traversal, a smallest TBS that is sufficient to transmit data that needs to be transmitted. If TBSs corresponding to a plurality of combinations of the MCS and the quantity of resource units are the same, the terminal may randomly select one of the combinations to determine the second resource information. Alternatively, one of the combinations is selected according to a predefined rule. For example, a combination with a relatively high or low MCS is always selected, or a combination with a relatively large or small quantity of resource units is always selected.

The foregoing example is merely an example. In actual application, the first resource information may further include another parameter, and any solution in which the terminal device determines the second resource information by using a similar rule falls within the protection scope of the embodiments of this application.

S84: After determining the second resource information, the terminal device can transmit msg3 by using a resource indicated by the second resource information, and the network device receives msg3 by using the resource indicated by the second resource information.

The network device actually indicates the first resource information to the terminal device. However, the terminal device does not use the first resource information, but re-determines the second resource information to transmit msg3. However, the network device does not know the second resource information used by the terminal device. Therefore, the network device may also need to use a method similar to that in step S83, and attempt to perform detection by using all quantities of resource units that are less than or equal to the quantity that is of resource units of msg3 and that is indicated in the first resource information and all MCSs that are less than or equal to the MCS indicated in the first resource information, to obtain msg3 sent by the terminal device.

After determining the second resource information, the terminal device can transmit msg3 by using the resource indicated by the second resource information.

In this embodiment of this application, the terminal device may indicate the power headroom of the terminal device to the network device by using msg3. For a specific indication manner, refer to the descriptions of the embodiment shown in FIG. 2. Alternatively, the terminal device may transmit, to the network device by using msg3, other information, for example, downlink interference information of the terminal device, or other data. Specific information transmitted by using msg3 is not limited.

S85: The network device obtains, based on the received msg3, the information sent by the terminal device.

For example, if the terminal device indicates the power headroom of the terminal device by using msg3, the network device can determine the power headroom of the terminal device by parsing msg3. For example, the terminal device actually indicates, by using msg3, a power headroom level to which the power headroom of the terminal device belongs, and the network device can determine the power headroom of the terminal device by performing matching between a corresponding power headroom table and the power headroom level indicated by the terminal device by using msg3.

S81, S84, and S85 in the embodiment shown in FIG. 8 are optional steps and are not mandatory.

It can be learned that, in this embodiment of this application, the data early transmission procedure may be used. In addition, if the network device allocates excessively many resources, the terminal device may totally re-determine a resource based on a resource needed by the terminal device to actually transmit msg3. In this way, the determined resource meets an actual transmission requirement of the terminal device, and there is no excessive resource. Therefore, the terminal device does not need to add a large quantity of padding bits, so that the terminal device can reduce power consumption of the terminal device while transmitting the information to the network device.

In the embodiment shown in FIG. 7, the terminal device determines the second resource information by using the proper subset of the parameters included in the first resource information. In the embodiment shown in FIG. 8, the terminal device re-determines the resource information used to transmit msg3. The following describes a second resource determining method. The method can also resolve the problem that the terminal device needs to add a large quantity of padding bits when sending data to the network device by using the early data transmission mechanism. However, in this method, the terminal device may determine, in another manner, resource information used to actually transmit msg3.

Figure 9:
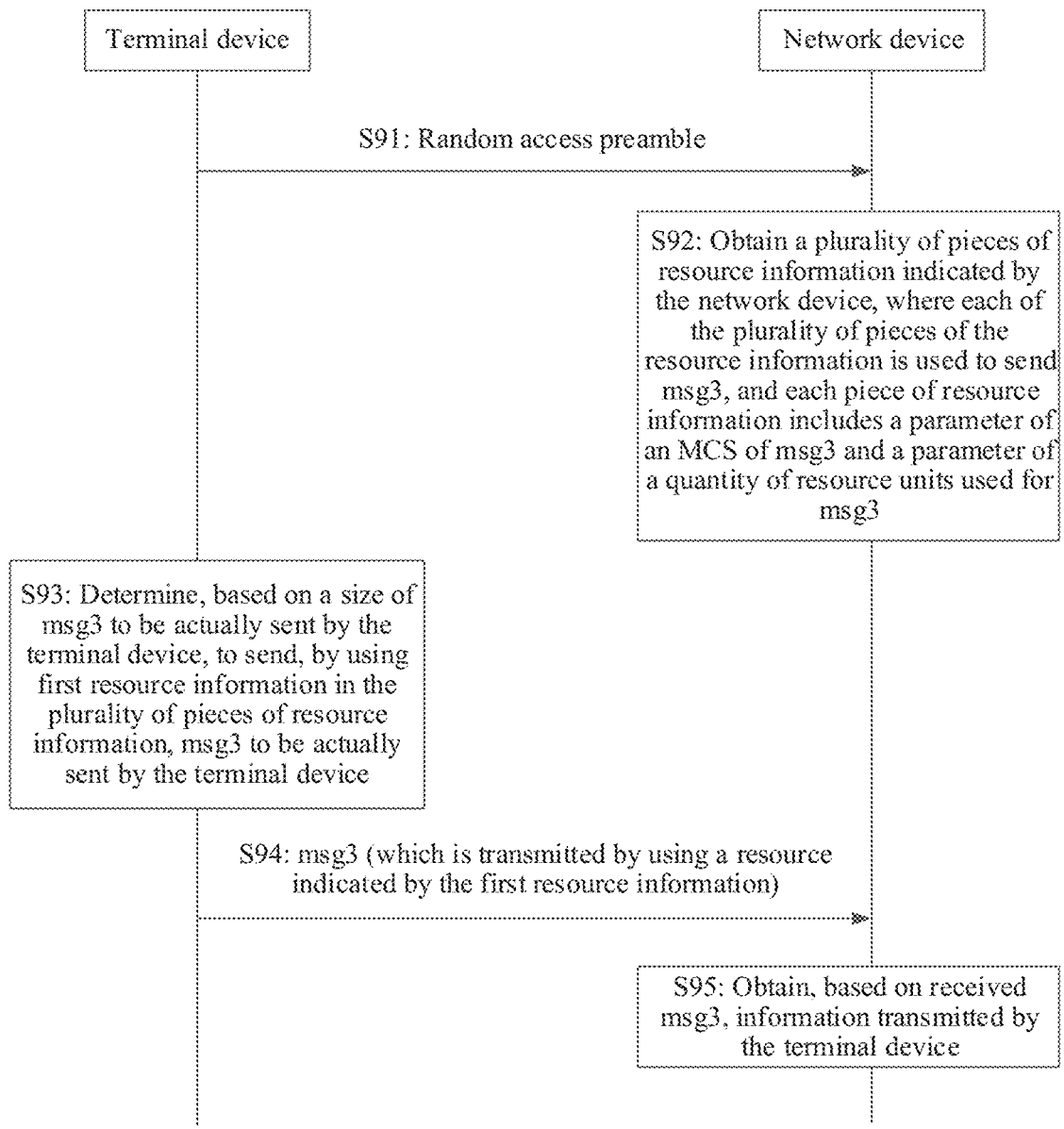
FIG. 9 is a flowchart of a third resource determining method according to an embodiment of this application.

Referring to FIG. 9, a procedure of the method is described as follows:

S91: A terminal device sends a random access preamble to a network device, and the network device receives the random access preamble from the terminal device.

Because a data early transmission mechanism is used, the terminal device may send the random access preamble to the network device on a reserved resource used for early data transmission, and the network device also receives the random access preamble from the terminal device on the reserved resource used for early data transmission.

S92: The network device indicates a plurality of pieces of resource information to the terminal device, and the terminal device obtains the plurality of pieces of resource information indicated by the network device, where each of the plurality of pieces of resource information is used to send msg3, and each of the plurality of pieces of resource information includes a parameter of an MCS of msg3 and a parameter of a quantity of resource units used for msg3.

The terminal device obtains the plurality of pieces of resource information indicated by the network device, for example, by using an RAR received from the network device. For example, the network device sends an RAR message to the terminal device, and the terminal device receives the RAR message from the network device. The RAR message may include a plurality of UL grants. Each UL grant may be used to indicate a piece of resource information, and each UL grant may be used to indicate the MCS used for msg3, and a quantity of RUs used for msg3. The RU is a resource unit, and RUs may be different in different systems. The quantity of RUs may indicate a quantity of used resources. Certainly, in parameters indicated by different UL grants, at least one parameter is different. Therefore, S82 in FIG. 8 uses an example in which the terminal device obtains the first resource information by using the RAR received from the network device. In other words, S82 in FIG. 8 includes a process in which the network device sends the RAR to the terminal device and the terminal device receives the RAR from the network device, and further includes a process in which the terminal device obtains the plurality of pieces of resource information by using the RAR.

In addition to the plurality of UL grants the network device may further indicate, in the RAR, a quantity of the UL grants included in the RAR, namely, a quantity of pieces of resource information indicated by the RAR. For example, the quantity of pieces of resource information indicated by the RAR may be indicated by using a reserved bit in a subheader of the RAR or may be indicated by using a reserved bit in a payload of the RAR. This is not specifically limited. The quantity of pieces of resource information indicated by the RAR may be indicated in different manners.

Further, the network device may separately configure quantities of UL grants for terminal devices at different coverage levels and/or different downlink carriers. In this case, for the terminal devices at different coverage levels and/or terminal devices that receive RARs by using different downlink carriers, quantities of UL grants included in the RARs may be different.

Alternatively, the network device may indicate, to the terminal device in another manner, the quantity of UL grants included in the RAR For example, the network device performs indication by using a broadcast message. For example, the broadcast message may be sent before S21, and the broadcast message may indicate the quantity of UL grants included in the RAR subsequently sent by the network device. After receiving the broadcast message and the RAR, the terminal device can determine, based on the broadcast message, the quantity of UL grants included in the RAR.

Similarly, when the network device performs indication by using the broadcast message, the network device may also separately configure different quantities of UL grants for the terminal devices at different coverage levels and/or for different downlink carriers. For example, the network device may send, by using the broadcast message, a quantity of UL grants that is configured for a terminal device at at least one coverage level and/or at least one downlink carrier. In this case, if the network device sends the quantity of UL grants that is configured for the terminal device at at least one coverage level by using the broadcast message, after receiving the broadcast message and the RAR, the terminal device can determine, based on the coverage level of the terminal device, the quantity of UL grants included in the RAR: or if the network device sends, by using the broadcast message, the quantity of UL grants that is configured for the at least one downlink carrier, after receiving the broadcast message and the RAR, the terminal device can determine, based on the downlink carrier used by the terminal device to receive the RAR, the quantity of UL grants included in the RAR.

A manner in which the network device indicates the quantity of UL grants included in the RAR includes but is not limited to the following two manners:

For example, in one manner, the quantity is directly indicated. In this case, if the RAR includes one UL grant, the network device indicates that the quantity of UL grants is 1 if the RAR includes two UL grants, the network device indicates that the quantity of UL grants is 2; if the RAR includes three UL grants, the network device indicates that the quantity of UL grants is 3; and so on. This indication manner is relatively simple and direct, and is easy to understand and implement.

For example, in the other manner, whether the RAR includes one or more UL grants is indicated. In this case, a specific quantity of UL grants may be specified by using a protocol if there are a plurality of UL grants. For example, the protocol specifies that there are specifically two UL grants if there are a plurality of UL grants. In this case, for example, 1 bit is used for indication. If a value of the bit is "0", it indicates that the RAR includes one UL grant. If a value of the bit is "1" it indicates that the RAR includes a plurality of UL grants, and it can be learned from specification of the protocol that there are specifically two UL grants if there are a plurality of UL grants. Certainly, the quantity of UL grants that is specified in the protocol is not limited to 2, and a specific bit indication manner is not limited thereto.

A TBS that may be used to report or transmit data in msg3, and a mapping relationship between the TBS, the MCS, and the quantity of resource units are information preconfigured by the network device for the terminal device, or information that is standardized and fixed in a protocol. Therefore, after obtaining the MCS used for msg3 and the quantity of resource units used for msg3, the terminal device can determine, by looking up a table, a TBS indicated by each of the plurality of pieces of resource information. For a specific table lookup manner, refer to the prior art. Alternatively, each of the plurality of pieces of resource information may directly carry the MCS used for msg3, the quantity of resource units used for msg3, and the TBS used for msg3. In other words, the network device may directly indicate the TBS, and the terminal device does not need to look up a table.

S93: The terminal device determines, based on a size of msg3 to be actually sent by the terminal device, to send, by using first resource information in the plurality of pieces of resource information, msg3 to be actually sent by the terminal device.

The terminal device knows a TBS actually needed by the terminal device to transmit msg3. In this case, the terminal device may select, from the plurality of pieces of resource information based on the TBS actually needed to transmit msg3, one piece of proper resource information to send msg3. For example, the first resource information is selected. The proper resource information may mean that a difference between a TBS included in the resource information and a TBS actually needed to transmit msg3 is minimum, and the TBS included in the resource information is greater than or equal to the TBS actually needed by the terminal device to transmit msg3.

S94: The terminal device transmits msg3 to the network device by using a resource indicated by the first resource information, and the network device receives msg3 from the terminal device by using the resource indicated by the first resource information.

The network device actually indicates the plurality of pieces of resource information to the terminal device, but the terminal device transmits msg3 by using only the resource indicated by the first resource information. However, the network device does not know a resource corresponding to which resource information is used by the terminal device. Therefore, the network device may still perform detection on all the resources indicated by the plurality of pieces of resource information, to obtain msg3 sent by the terminal device.

In this embodiment of this application, the terminal device may indicate a power headroom of the terminal device to the network device by using msg3. For a specific indication manner, refer to the descriptions of the embodiment shown in FIG. 2. Alternatively, the terminal device may transmit, to the network device by using msg3, other information, for example, downlink interference information of the terminal device, or other data. Specific information transmitted by using msg3 is not limited.

S95: The network device obtains, based on the received msg3, the information sent by the terminal device.

For example, if the terminal device indicates the power headroom of the terminal device by using msg3, the network device can determine the power headroom of the terminal device by parsing msg3. For example, the terminal device actually indicates, by using msg3, a power headroom level to which the power headroom of the terminal device belongs, and the network device can determine the power headroom of the terminal device by performing matching between a corresponding power headroom table and the power headroom level indicated by the terminal device by using msg3.

S91, S94, and S95 in the embodiment shown in FIG. 9 are optional steps and are not mandatory.

In this embodiment of this application, the network device may allocate a plurality of pieces of resource information, so that the terminal device may select one piece of resource information from the plurality of pieces of resource information for use. In this way, the terminal device follows instruction of the network device, and uses the early data transmission procedure. In addition, the terminal device can select relatively proper resource information to transmit msg3, and does not need to add a large quantity of padding bits, so that the terminal device can reduce power consumption of the terminal device while transmitting the information to the network device.

The following describes a device provided in the embodiments of this application with reference to the accompanying drawings.

Figure 10:
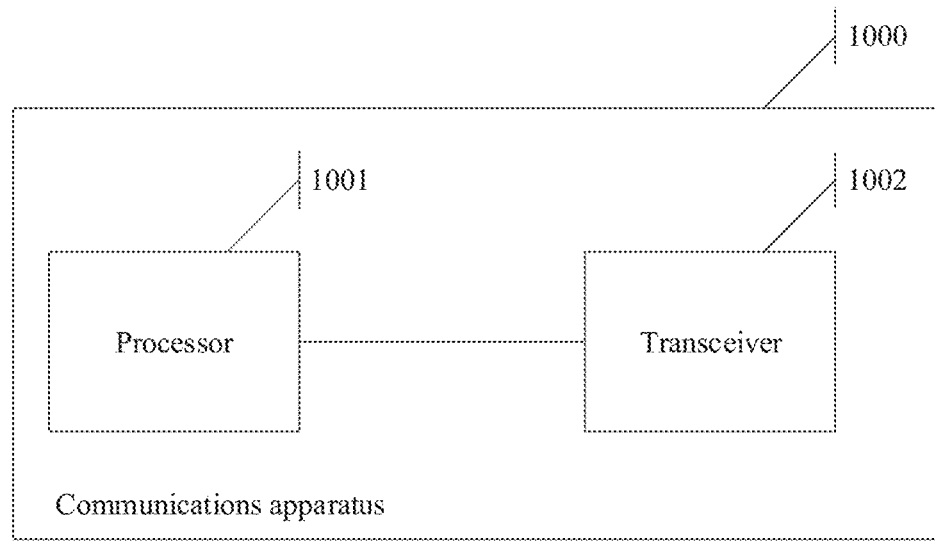
FIG. 10 is a schematic structural diagram of a communications apparatus that can be implemented by using a terminal device according to an embodiment of this application.

FIG. 10 is a schematic structural diagram of a communications apparatus 1000. The communications apparatus 1000 may implement functions of the terminal device described above. The communications apparatus 1000 may be the terminal device described above, or may be a chip disposed in the terminal device described above. The communications apparatus 1000 may include a processor 1001 and a transceiver 1002. The processor 1001 may be configured to perform S24 in the embodiment shown in FIG. 2, and/or support another process of the technology described in this specification. The transceiver 1002 may be configured to perform S21, S22, S23, and S25 in the embodiment shown in FIG. 2, and/or support another process of the technology described in this specification.

For example, the processor 1001 is configured to generate a MAC CE, where the MAC CE is used to indicate a power headroom in a first power headroom set or a power headroom in a second power headroom set; and if the MAC CE is used to indicate the power headroom in the first power headroom set, the MAC CE includes a first bit field and a second bit field, the first bit field is a reserved bit field, and the second bit field is used to indicate the power headroom in the first power headroom set; or if the MAC CE is used to indicate the power headroom in the second power headroom set, the MAC CE includes a third bit field, the third bit field is used to indicate the power headroom in the second power headroom set, and the third bit field includes a bit of the first bit field and a bit of the second bit field; and the transceiver 1002 is configured to send the MAC CE to a network device.

Alternatively, for example, the processor 1001 is configured to generate a MAC CE, where the MAC CE is used to indicate a power headroom in a first power headroom set or a power headroom in a second power headroom set, and the MAC CE includes a first bit field and a second bit field; and if the MAC CE is used to indicate the power headroom in the first power headroom set, the first bit field is a reserved bit field, and the second bit field is used to indicate the power headroom in the first power headroom set; or if the MAC CE is used to indicate the power headroom in the second power headroom set, the first bit field and the second bit field are used to indicate the power headroom in the second power headroom set; and the transceiver 1002 is configured to send the MAC CE to a network device.

All related content of the steps in the foregoing method embodiments may be cited in function descriptions of corresponding function modules. Details are not described herein again.

Figure 11:
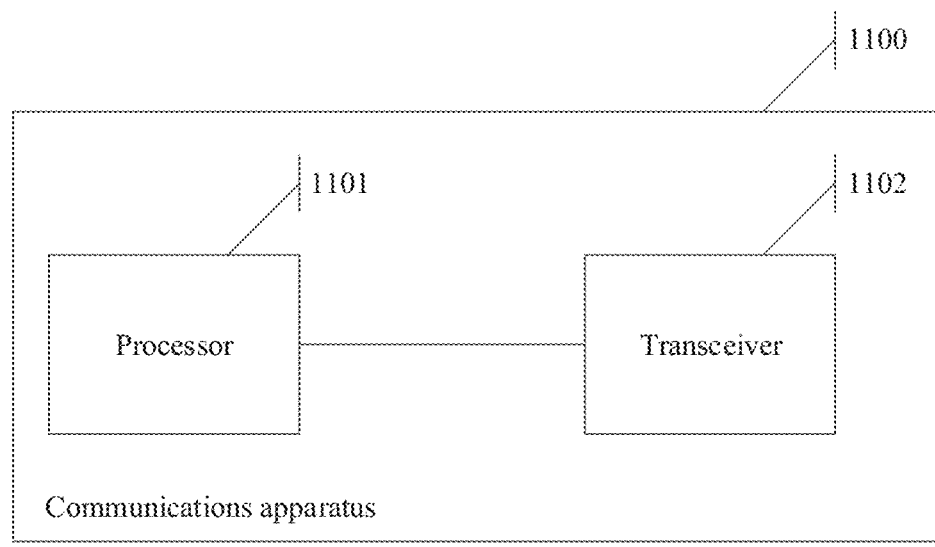
FIG. 11 is a schematic structural diagram of a communications apparatus that can be implemented by using a network device according to an embodiment of this application.

FIG. 11 is a schematic structural diagram of a communications apparatus 1100. The communications apparatus 1100 may implement functions of the network device described above. The communications apparatus 1100 may be the network device described above, or may be a chip disposed in the network device described above. The communications apparatus 1100 may include a processor 1101 and a transceiver 1102. The processor 1101 may be configured to perform S26 in the embodiment shown in FIG. 2, and/or support another process of the technology described in this specification. The transceiver 1102 may be configured to perform S21, S22, S23, and S25 in the embodiment shown in FIG. 2, and/or support another process of the technology described in this specification.

For example, the transceiver 1102 is configured to receive a MAC CE from a terminal device, where the MAC CE is used to indicate a power headroom in a first power headroom set or a power headroom in a second power headroom set; and the processor 1101 is configured to: if the MAC CE is used to indicate the power headroom in the first power headroom set, determine the power headroom in the first power headroom set based on a second bit field included in the MAC CE, where the MAC CE includes a first bit field and the second bit field, and the first bit field is a reserved bit field; or if the MAC CE is used to indicate the power headroom in the second power headroom set, determine the power headroom in the second power headroom set based on a third bit field included in the MAC CE, where the third bit field includes a bit of the first bit field and a bit of the second bit field.

Alternatively, for example, the transceiver 1102 is configured to receive a MAC CE from a terminal device, where the MAC CE is used to indicate a power headroom in a first power headroom set or a power headroom in a second power headroom set, and the MAC CE includes a first bit field and a second bit field; and the processor 1101 is configured to: if the MAC CE is used to indicate the power headroom in the first power headroom set, determine the power headroom in the first power headroom set based on the second bit field, where the first bit field is a reserved bit field; or if the MAC CE is used to indicate the power headroom in the second power headroom set, determine the power headroom in the second power headroom set based on the first bit field and the second bit field.

All related content of the steps in the foregoing method embodiments may be cited in function descriptions of corresponding function modules. Details are not described herein again.

Figure 12:
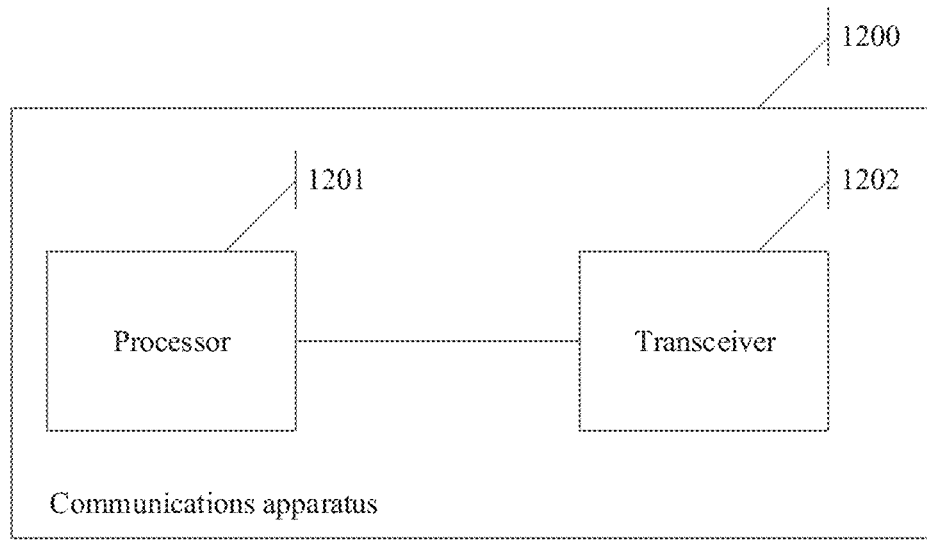
FIG. 12 is a schematic structural diagram of a communications apparatus that can be implemented by using a terminal device according to an embodiment of this application.

FIG. 12 is a schematic structural diagram of a communications apparatus 1200. The communications apparatus 1200 may implement functions of the terminal device described above. The communications apparatus 1200 may be the terminal device described above, or may be a chip disposed in the terminal device described above. The communications apparatus 1200 may include a processor 1201 and a transceiver 1202. The processor 1201 may be configured to perform S53 in the embodiment shown in FIG. 5, and/or support another process of the technology described in this specification. The transceiver 1202 may be configured to perform S52 and S54 in the embodiment shown in FIG. 5, and/or support another process of the technology described in this specification.

For example, the processor 1201 is configured to: when the communications apparatus 1200 is in a connected state, generate a MAC CE carrying a BSR, where the MAC CE further includes at least 3 bits, and the at least 3 bits are used to indicate a power headroom; and the transceiver 1202 is configured to send the MAC CE to a network device.

All related content of the steps in the foregoing method embodiments may be cited in function descriptions of corresponding function modules. Details are not described herein again.

Figure 13:
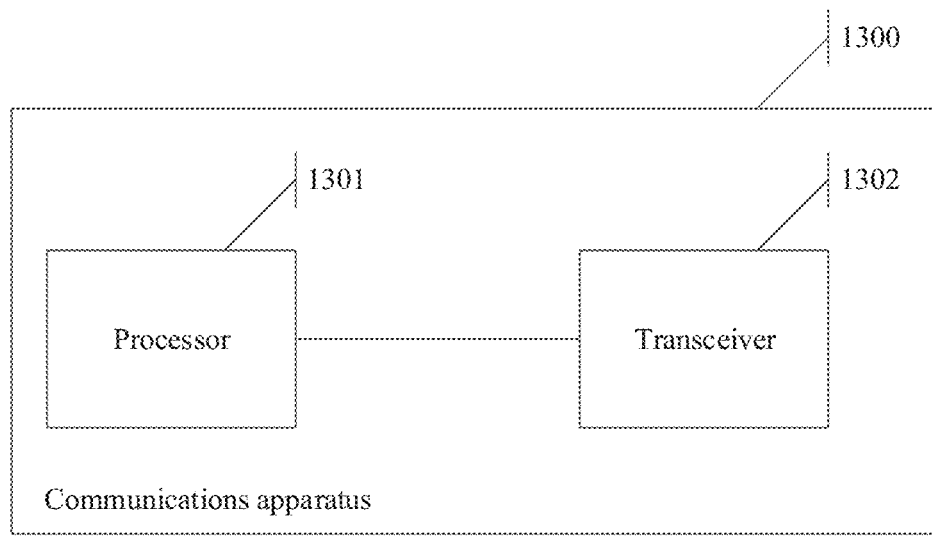
FIG. 13 is a schematic structural diagram of a communications apparatus that can be implemented by using a network device according to an embodiment of this application.

FIG. 13 is a schematic structural diagram of a communications apparatus 1300. The communications apparatus 1300 may implement functions of the network device described above. The communications apparatus 1300 may be the network device described above, or may be a chip disposed in the network device described above. The communications apparatus 1300 may include a processor 1301 and a transceiver 1302. The processor 1301 may be configured to perform S55 in the embodiment shown in FIG. 5, and/or support another process of the technology described in this specification. The transceiver 1302 may be configured to perform S52 and S54 in the embodiment shown in FIG. 5, and/or support another process of the technology described in this specification.

For example, the transceiver 1102 is configured to receive a MAC CE from a terminal device; and the processor 1101 is configured to determine a power headroom of the terminal device based on at least 3 bits included in the MAC CE, and obtain a BSR from the MAC CE.

All related content of the steps in the foregoing method embodiments may be cited in function descriptions of corresponding function modules. Details are not described herein again.

Figure 14:
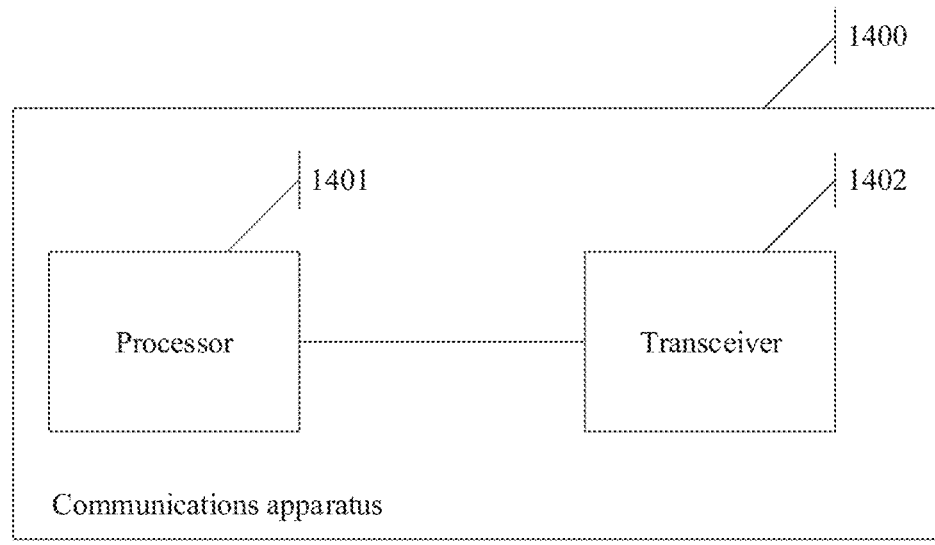
FIG. 14 is a schematic structural diagram of a communications apparatus that can be implemented by using a terminal device according to an embodiment of this application.

FIG. 14 is a schematic structural diagram of a communications apparatus 140. The communications apparatus 1400 may implement functions of the terminal device described above. The communications apparatus 1400 may be the terminal device described above, or may be a chip disposed in the terminal device described above. The communications apparatus 1400 may include a processor 1401. Optionally, the communications apparatus 1400 may further include a transceiver 1402. The processor 1401 may be configured to perform S72 and S73 in the embodiment shown in FIG. 7, and/or support another process of the technology described in this specification. The transceiver 1402 may be configured to perform S71, S72 (where the transceiver 1402 receives an RAR from a network device, and the processor 1401 obtains first resource information from the RAR), and S74 in the embodiment shown in FIG. 7, and/or support another process of the technology described in this specification.

For example, the processor 1401 is configured to obtain the first resource information indicated by the network device, where the first resource information is used to send a third message msg3, and the first resource information includes a parameter of a modulation and coding scheme of msg3 and a parameter of a quantity of resource units used for msg3; and the processor 1401 is further configured to determine second resource information based on a proper subset of the parameters included in the first resource information, where the second resource information is used to actually send msg3, a second transport block size is smaller than a first transport block size, the second transport block size is a transport block size, of msg3, included in the second resource information, and the first transport block size is a transport block size, of msg3, included in the first resource information.

All related content of the steps in the foregoing method embodiments may be cited in function descriptions of corresponding function modules. Details are not described herein again.

Figure 15:
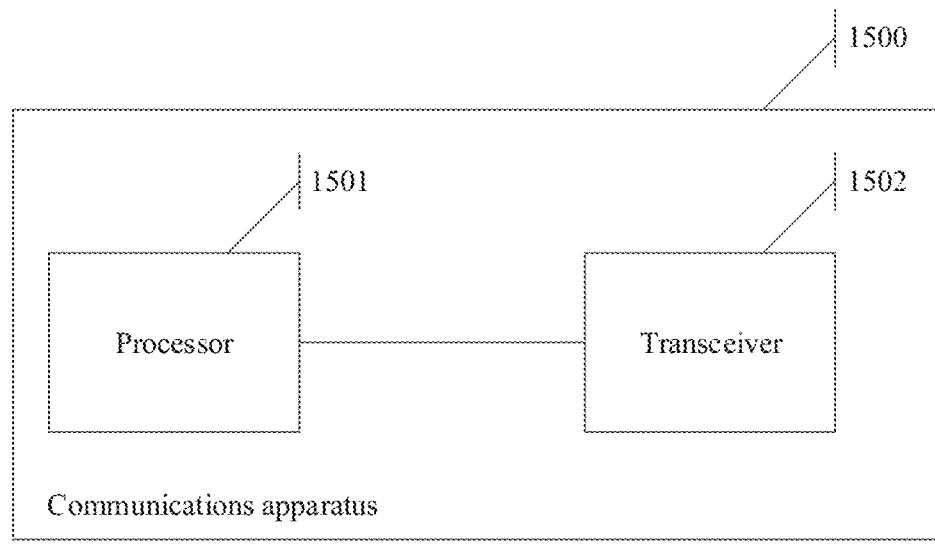
FIG. 15 is a schematic structural diagram of a communications apparatus that can be implemented by using a terminal device according to an embodiment of this application.

FIG. 15 is a schematic structural diagram of a communications apparatus 1500. The communications apparatus 1500 may implement functions of the terminal device described above. The communications apparatus 1500 may be the terminal device described above, or may be a chip disposed in the terminal device described above. The communications apparatus 1500 may include a processor 1501.

Optionally, the communications apparatus 1400 may further include a transceiver 1502. The processor 1501 may be configured to perform S82 and S83 in the embodiment shown in FIG. 8, and/or support another process of the technology described in this specification. The transceiver 1502 may be configured to perform S81, S82 (where the transceiver 1502 receives an RAR from a network device, and the processor 1501 obtains first resource information from the RAR), and S84 in the embodiment shown in FIG. 8, and/or support another process of the technology described in this specification.

For example, the processor 1501 is configured to obtain the first resource information indicated by the network device, where the first resource information is used to send a third message msg3, and the first resource information includes a parameter of a modulation and coding scheme of msg3 and a parameter of a quantity of resource units used for msg3; and the processor 1501 is further configured to: if determining that a first transport block size is greater than a second transport block size, re-determine second resource information, where a transport block size included in the second resource information is the second transport block size. The second transport block size is a transport block size needed by the terminal device to actually send msg3, and the first transport block size is a transport block size, of msg3, included in the first resource information.

All related content of the steps in the foregoing method embodiments may be cited in function descriptions of corresponding function modules. Details are not described herein again.

Figure 16:
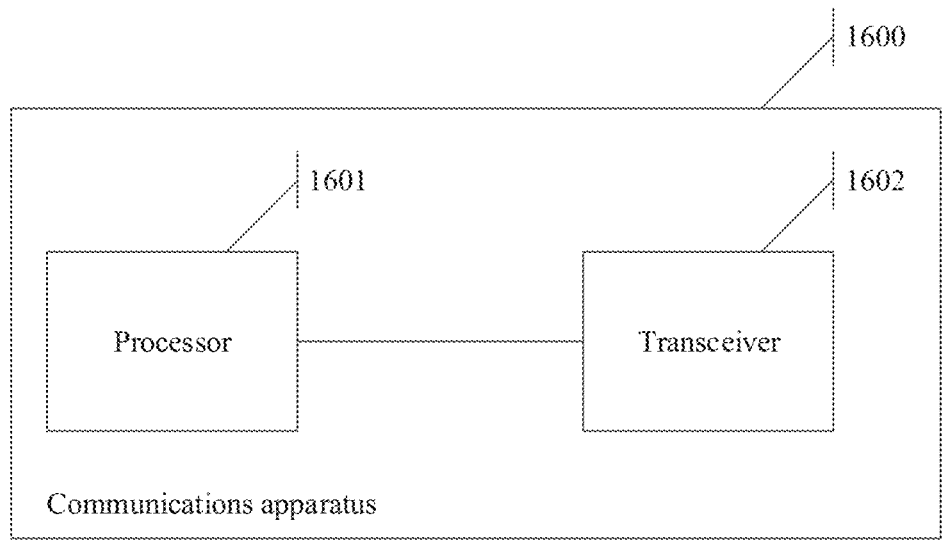
FIG. 16 is a schematic structural diagram of a communications apparatus that can be implemented by using a terminal device according to an embodiment of this application.

FIG. 16 is a schematic structural diagram of a communications apparatus 1600. The communications apparatus 1600 may implement functions of the terminal device described above. The communications apparatus 1600 may be the terminal device described above, or may be a chip disposed in the terminal device described above. The communications apparatus 1600 may include a processor 1601. Optionally, the communications apparatus 1600 may further include a transceiver 1602. The processor 1601 may be configured to perform S92 and S93 in the embodiment shown in FIG. 9, and/or support another process of the technology described in this specification. The transceiver 1602 may be configured to perform S91, S92 (where the transceiver 1602 receives an RAR from a network device, and the processor 1601 obtains first resource information from the RAR), and S94 in the embodiment shown in FIG. 9, and/or support another process of the technology described in this specification.

For example, the processor 1601 is configured to obtain a plurality of pieces of resource information indicated by the network device, where each of the plurality of pieces of resource information is used to send a third message msg3, and each piece of resource information includes a parameter of a modulation and coding scheme of msg3 and a parameter of a quantity of resource units used for msg3; and the processor 1601 is further configured to determine, based on a size of an actual to-be-sent msg3, to send the actual to-be-sent msg3 by using first resource information in the plurality of pieces of resource information.

All related content of the steps in the foregoing method embodiments may be cited in function descriptions of corresponding function modules. Details are not described herein again.

Figure 17A:
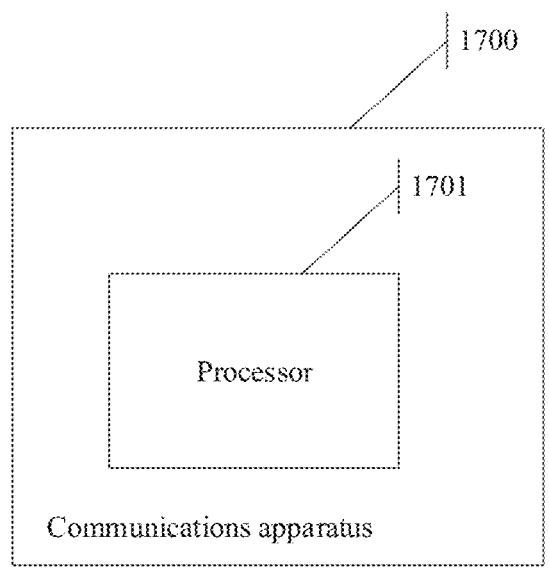
FIG. 17A and FIG. 17B are two schematic structural diagrams of a communications apparatus according to an embodiment of this application.

In a simple embodiment, a person skilled in the art can figure out that the communications apparatus 1000, the communications apparatus 1100, the communications apparatus 1200, the communications apparatus 1300, the communications apparatus 1400, the communications apparatus 1500, and the communications apparatus 1600 each may alternatively be implemented by using a structure of a communications apparatus 1700 shown in FIG. 17A. The communications apparatus 1700 may implement functions of the network device or the terminal device described above. The communications apparatus 1700 may include a processor 1701. When the communications apparatus 1700 is configured to implement functions of the terminal device in the embodiment shown in FIG. 2, the processor 1701 may be configured to perform S24 in the embodiment shown in FIG. 2, and/or support another process of the technology described in this specification. When the communications apparatus 1700 is configured to implement functions of the network device in the embodiment shown in FIG. 2, the processor 1701 may be configured to perform S26 in the embodiment shown in FIG. 2, and/or support another process of the technology described in this specification. When the communications apparatus 1700 is configured to implement functions of the terminal device in the embodiment shown in FIG. 5, the processor 1701 may be configured to perform S53 in the embodiment shown in FIG. 5, and/or support another process of the technology described in this specification. When the communications apparatus 1700 is configured to implement functions of the network device in the embodiment shown in FIG. 5, the processor 1701 may be configured to perform S55 in the embodiment shown in FIG. 5, and/or support another process of the technology described in this specification. When the communications apparatus 1700 is configured to implement functions of the terminal device in the embodiment shown in FIG. 7, the processor 1701 may be configured to perform S72 and S73 in the embodiment shown in FIG. 7, and/or support another process of the technology described in this specification. When the communications apparatus 1700 is configured to implement functions of the terminal device in the embodiment shown in FIG. 8, the processor 1701 may be configured to perform S82 and S83 in the embodiment shown in FIG. 8, and/or support another process of the technology described in this specification. When the communications apparatus 1700 is configured to implement functions of the terminal device in the embodiment shown in FIG. 9, the processor 1701 may be configured to perform S92 and S93 in the embodiment shown in FIG. 9, and/or support another process of the technology described in this specification.

The communications apparatus 1700 may be implemented by using a field-programmable gate array (FPGA), an application-specific integrated chip (ASIC), a system on a chip (SoC), a central processing unit (CPU), a network processor (NP), a digital signal processing circuit (DSP), a micro controller unit (MCU), a programmable controller (PLD), or another integrated chip, and the communications apparatus 600 may be disposed in the network device or the communications device in the embodiments of this application, to enable the network device or the communications device to implement the message transmission method provided in the embodiments of this application.

In an optional implementation, the communications apparatus 1700 may include a transceiver component, configured to communicate with a network device. For example, when the communications apparatus 1700 is configured to implement functions of the network device or the terminal device in the embodiment shown in FIG. 2, the transceiver component may be configured to perform S21, S22, S23, and S25 in the embodiment shown in FIG. 2, and/or support another process of the technology described in this specification. When the communications apparatus 1700 is configured to implement functions of the network device or the terminal device in the embodiment shown in FIG. 5, the transceiver component may be configured to perform S52 and S54 in the embodiment shown in FIG. 5, and/or support another process of the technology described in this specification. When the communications apparatus 1700 is configured to implement functions of the network device or the terminal device in the embodiment shown in FIG. 7, the transceiver component may be configured to perform S71, S72 (where the transceiver component receives an RAR from a network device, and the processor 1701 obtains first resource information from the RAR), and S74 in the embodiment shown in FIG. 7, and/or support another process of the technology described in this specification. When the communications apparatus 1700 is configured to implement functions of the network device or the terminal device in the embodiment shown in FIG. 8, the transceiver component may be configured to perform S81, S82 (where the transceiver component receives an RAR from a network device, and the processor 1701 obtains first resource information from the RAR), and S84 in the embodiment shown in FIG. 8, and/or support another process of the technology described in this specification. When the communications apparatus 1700 is configured to implement functions of the network device or the terminal device in the embodiment shown in FIG. 9, the transceiver component may be configured to perform S91, S92 (where the transceiver component receives an RAR from a network device, and the processor 1701 obtains first resource information from the RAR), and S94 in the embodiment shown in FIG. 9, and/or support another process of the technology described in this specification.

Figure 17B:
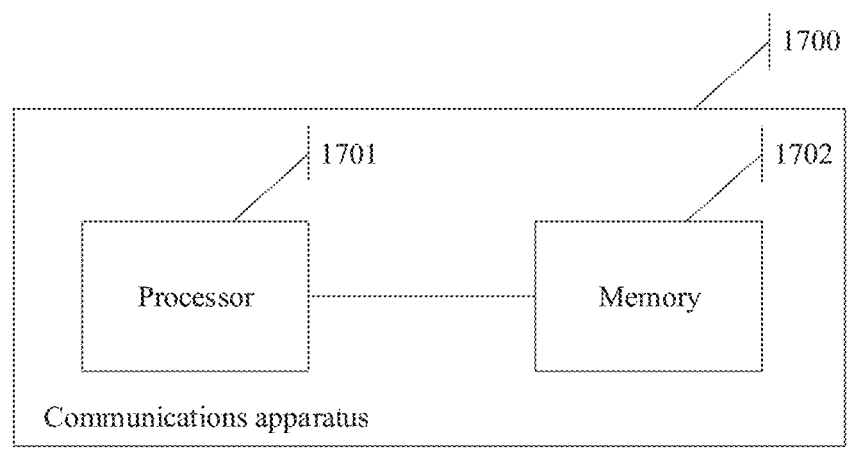

In an optional implementation, referring to FIG. 17B, the communications apparatus 1700 may further include a memory 1702. The memory 1702 is configured to store computer programs or instructions, and the processor 1701 is configured to decode and execute the computer programs or the instructions. It should be understood that these computer programs or instructions may include function programs of the foregoing network device or the foregoing terminal device. When the function programs of the network device are decoded and executed by the processor 1701, the network device may be enabled to implement the functions of the network device in the method provided in the embodiment shown in FIG. 2, the embodiment shown in FIG. 5, the embodiment shown in FIG. 7, the embodiment shown in FIG. 8, or the embodiment shown in FIG. 9. When the function programs of the terminal device are decoded and executed by the processor 1701, the terminal device may be enabled to implement the functions of the terminal device in the method provided in the embodiment shown in FIG. 2, the embodiment shown in FIG. 5, the embodiment shown in FIG. 7, the embodiment shown in FIG. 8, or the embodiment shown in FIG. 9.

In another optional implementation, these function programs of the network device or the terminal device are stored in an external memory of the communications apparatus 1700. When the function programs of the network device are decoded and executed by the processor 1701, the memory 1702 temporarily stores some or all of content of the function programs of the network device. When the function programs of the terminal device are decoded and executed by the processor 1701, the memory 1702 temporarily stores some or all content of the function programs of the terminal device.

In another optional implementation, these function programs of the network device or the terminal device are stored in the internal memory 1702 of the communications apparatus 1700. When the internal memory 1702 of the communications apparatus 1700 stores the function programs of the network device, the communications apparatus 1700 may be disposed in the network device in the embodiments of this application. When the internal memory 1702 of the communications apparatus 1700 stores the function programs of the terminal device, the communications apparatus 1700 may be disposed in the terminal device in the embodiments of this application.

In still another optional implementation, some content of these function programs of the network device is stored in an external memory of the communications apparatus 1700, and the other content of these function programs of the network device is stored in the internal memory 1702 of the communications apparatus 1700. Alternatively, some content of these function programs of the terminal device is stored in an external memory of the communications apparatus 1700, and other content of these function programs of the terminal device is stored in the internal memory 1702 of the communications apparatus 1700.

In the embodiments of this application, the communications apparatus 1000, the communications apparatus 1100, the communications apparatus 1200, the communications apparatus 1300, the communications apparatus 1400, the communications apparatus 1500, the communications apparatus 1600, and the communications apparatus 1700 are presented in a form in which each function module is obtained through division corresponding to each function, or may be presented in a form in which each function module is obtained through division in an integrated manner. The "module" herein may be an ASIC, a processor and a memory that execute one or more software or firmware programs, an integrated logic circuit, and/or another component that can provide the foregoing functions.

In addition, the communications apparatus 1000 provided in the embodiment shown in FIG. 10 may alternatively be implemented in another form. For example, the terminal device includes a processing module and a transceiver module. For example, the processing module may be implemented by using the processor 1001, and the transceiver module may be implemented by using the transceiver 1002. The processing module may be configured to perform S24 in the embodiment shown in FIG. 2, and/or support another process of the technology described in this specification. The transceiver module may be configured to perform S21, S22, S23, and S25 in the embodiment shown in FIG. 2, and/or support another process of the technology described in this specification.

For example, the processing module is configured to generate a MAC CE, where the MAC CE is used to indicate a power headroom in a first power headroom set or a power headroom in a second power headroom set; and if the MAC CE is used to indicate the power headroom in the first power headroom set, the MAC CE includes a first bit field and a second bit field, the first bit field is a reserved bit field, and the second bit field is used to indicate the power headroom in the first power headroom set; or if the MAC CE is used to indicate the power headroom in the second power headroom set, the MAC CE includes a third bit field, the third bit field is used to indicate the power headroom in the second power headroom set, and the third bit field includes a bit of the first bit field and a bit of the second bit field; and the transceiver module is configured to send the MAC CE to a network device.

Alternatively, for example, the processing module is configured to generate a MAC CE, where the MAC CE is used to indicate a power headroom in a first power headroom set or a power headroom in a second power headroom set, and the MAC CE includes a first bit field and a second bit field; and if the MAC CE is used to indicate the power headroom in the first power headroom set, the first bit field is a reserved bit field, and the second bit field is used to indicate the power headroom in the first power headroom set; or if the MAC CE is used to indicate the power headroom in the second power headroom set, the first bit field and the second bit field are used to indicate the power headroom in the second power headroom set; and the transceiver module is configured to send the MAC CE to a network device.

All related content of the steps in the foregoing method embodiments may be cited in function descriptions of corresponding function modules. Details are not described herein again.

The communications apparatus 1100 provided in the embodiment shown in FIG. 11 may alternatively be implemented in another form. For example, the network device includes a processing module and a transceiver module. For example, the processing module may be implemented by using the processor 1101, and the transceiver module may be implemented by using the transceiver 1102. The processing module may be configured to perform S26 in the embodiment shown in FIG. 2, and/or support another process of the technology described in this specification. The transceiver module may be configured to perform S21, S22, S23, and S25 in the embodiment shown in FIG. 2, and/or support another process of the technology described in this specification.

For example, the transceiver module is configured to receive a MAC CE from a terminal device, where the MAC CE is used to indicate a power headroom in a first power headroom set or a power headroom in a second power headroom set; and the processing module is configured to: if the MAC CE is used to indicate the power headroom in the first power headroom set, determine the power headroom in the first power headroom set based on a second bit field included in the MAC CE, where the MAC CE includes a first bit field and the second bit field, and the first bit field is a reserved bit field; or if the MAC CE is used to indicate the power headroom in the second power headroom set, determine the power headroom in the second power headroom set based on a third bit field included in the MAC CE, where the third bit field includes a bit of the first bit field and a bit of the second bit field.

Alternatively, for example, the transceiver module is configured to receive a MAC CE from a terminal device, where the MAC CE is used to indicate a power headroom in a first power headroom set or a power headroom in a second power headroom set, and the MAC CE includes a first bit field and a second bit field; and the processing module is configured to: if the MAC CE is used to indicate the power headroom in the first power headroom set, determine the power headroom in the first power headroom set based on the second bit field, where the first bit field is a reserved bit field; or if the MAC CE is used to indicate the power headroom in the second power headroom set, determine the power headroom in the second power headroom set based on the first bit field and the second bit field.

All related content of the steps in the foregoing method embodiments may be cited in function descriptions of corresponding function modules. Details are not described herein again.

The communications apparatus 1200 provided in the embodiment shown in FIG. 12 may alternatively be implemented in another form. For example, the terminal device includes a processing module and a transceiver module. For example, the processing module may be implemented by using the processor 1201, and the transceiver module may be implemented by using the transceiver 1202. The processing module may be configured to perform S53 in the embodiment shown in FIG. 5, and/or support another process of the technology described in this specification. The transceiver module may be configured to perform S52 and S54 in the embodiment shown in FIG. 5, and/or support another process of the technology described in this specification.

For example, the processing module is configured to: when the communications apparatus 1200 is in a connected state, generate a MAC CE carrying a BSR, where the MAC CE further includes at least 3 bits, and the at least 3 bits are used to indicate a power headroom; and the transceiver module is configured to send the MAC CE to a network device.

All related content of the steps in the foregoing method embodiments may be cited in function descriptions of corresponding function modules. Details are not described herein again.

The communications apparatus 1300 provided in the embodiment shown in FIG. 13 may alternatively be implemented in another form. For example, the network device includes a processing module and a transceiver module. For example, the processing module may be implemented by using the processor 1301, and the transceiver module may be implemented by using the transceiver 1302. The processing module may be configured to perform S55 in the embodiment shown in FIG. 5, and/or support another process of the technology described in this specification. The transceiver module may be configured to perform S52 and S54 in the embodiment shown in FIG. 5, and/or support another process of the technology described in this specification.

For example, the transceiver module is configured to receive a MAC CE from a terminal device; and the processing module is configured to determine a power headroom of the terminal device based on at least 3 bits included in the MAC CE, and obtain a BSR from the MAC CE.

All related content of the steps in the foregoing method embodiments may be cited in function descriptions of corresponding function modules. Details are not described herein again.

The communications apparatus 1400 provided in the embodiment shown in FIG. 14 may alternatively be implemented in another form. For example, the terminal device includes a processing module. Optionally, the terminal device further includes a transceiver module. For example, the processing module may be implemented by using the processor 1401, and the transceiver module may be implemented by using the transceiver 1402. The processing module may be configured to perform S72 and S73 in the embodiment shown in FIG. 7, and/or support another process of the technology described in this specification. The transceiver module may be configured to perform S71, S72 (where the transceiver module receives an RAR from a network device, and the processing module obtains first resource information from the RAR), and S74 in the embodiment shown in FIG. 7, and/or support another process of the technology described in this specification.

For example, the processing module is configured to obtain the first resource information indicated by the network device, where the first resource information is used to send a third message msg3, and the first resource information includes a parameter of a modulation and coding scheme of msg3 and a parameter of a quantity of resource units used for msg3; and the processing module is further configured to determine second resource information based on a proper subset of the parameters included in the first resource information, where the second resource information is used to actually send msg3, a second transport block size is smaller than a first transport block size, the second transport block size is a transport block size, of msg3, included in the second resource information, and the first transport block size is a transport block size, of msg3, included in the first resource information.

All related content of the steps in the foregoing method embodiments may be cited in function descriptions of corresponding function modules. Details are not described herein again.

The communications apparatus 1500 provided in the embodiment shown in FIG. 15 may alternatively be implemented in another form. For example, the terminal device includes a processing module. Optionally, the terminal device further includes a transceiver module. For example, the processing module may be implemented by using the processor 1501, and the transceiver module may be implemented by using the transceiver 1502. The processing module may be configured to perform S82 and S83 in the embodiment shown in FIG. 8, and/or support another process of the technology described in this specification. The transceiver module may be configured to perform S81, S82 (where the transceiver module receives an RAR from a network device, and the processing module obtains first resource information from the RAR), and S84 in the embodiment shown in FIG. 8, and/or support another process of the technology described in this specification.

For example, the processing module is configured to obtain the first resource information indicated by the network device, where the first resource information is used to send a third message msg3, and the first resource information includes a parameter of a modulation and coding scheme of msg3 and a parameter of a quantity of resource units used for msg3; and the processing module is further configured to: if determining that a first transport block size is greater than a second transport block size, re-determine second resource information, where a transport block size included in the second resource information is the second transport block size. The second transport block size is a transport block size needed by the terminal device to actually send msg3, and the first transport block size is a transport block size, of msg3, included in the first resource information.

All related content of the steps in the foregoing method embodiments may be cited in function descriptions of corresponding function modules. Details are not described herein again.

The communications apparatus 1600 provided in the embodiment shown in FIG. 16 may alternatively be implemented in another form. For example, the terminal device includes a processing module. Optionally, the terminal device further includes a transceiver module. For example, the processing module may be implemented by using the processor 1601, and the transceiver module may be implemented by using the transceiver 1602. The processing module may be configured to perform S92 and S93 in the embodiment shown in FIG. 9, and/or support another process of the technology described in this specification. The transceiver module may be configured to perform S91, S92 (where the transceiver module receives an RAR from a network device, and the processing module obtains first resource information from the RAR), and S94 in the embodiment shown in FIG. 9, and/or support another process of the technology described in this specification.

For example, the processing module is configured to obtain a plurality of pieces of resource information indicated by the network device, where each of the plurality of pieces of the resource information is used to send a third message msg3, and each piece of resource information includes a parameter of a modulation and coding scheme of msg3 and a parameter of a quantity of resource units used for msg3; and the processing module is further configured to determine, based on a size of an actual to-be-sent msg3, to send the actual to-be-sent msg3 by using first resource information in the plurality of pieces of resource information.

All related content of the steps in the foregoing method embodiments may be cited in function descriptions of corresponding function modules. Details are not described herein again.

The communications apparatus 1000, the communications apparatus 1100, the communications apparatus 1200, the communications apparatus 1300, the communications apparatus 1400, the communications apparatus 1500, the communications apparatus 1600, and the communications apparatus 1700 provided in the embodiments of this application may be configured to perform the method provided in the embodiment shown in FIG. 2, the embodiment shown in FIG. 5, the embodiment shown in FIG. 7, the embodiment shown in FIG. 8, or the embodiment shown in FIG. 9. Therefore, for technical effects that can be achieved by the apparatuses, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A signal sending method, comprising:
generating a media access control (MAC) control element (CE), wherein the MAC CE is used to indicate a power headroom in a first power headroom set or a power headroom in a second power headroom set, wherein:
when the MAC CE is used to indicate the power headroom in the first power headroom set, the MAC CE comprises a first bit field, a second bit field, and a data volume field, wherein the first bit field is a reserved bit field, wherein the second bit field is used to indicate the power headroom in the first power headroom set, and wherein the data volume field indicates a data volume; and
when the MAC CE is used to indicate the power headroom in the second power headroom set, the MAC CE comprises a third bit field and the data volume field, wherein the third bit field is used to indicate the power headroom in the second power headroom set, and wherein the third bit field comprises a bit of the first bit field and a bit of the second bit field; and
sending the MAC CE to a network device.

2. The method according to claim 1, wherein the MAC CE further comprises a fourth bit field, and wherein:
when the MAC CE is used to indicate the power headroom in the first power headroom set, the fourth bit field is a reserved bit field in the MAC CE; and
when the MAC CE is used to indicate the power headroom in the second power headroom set, the fourth bit field is used to indicate that the power headroom is indicated by using the third bit field.

3. The method according to claim 1, wherein the method further comprises:
sending first signaling to the network device, wherein the first signaling is used to indicate that the power headroom is indicated by using the third bit field; or
sending the MAC CE to the network device through a common control channel (CCCH), wherein a logical channel identifier of the CCCH is a first identifier, and wherein the first identifier is used to indicate that the power headroom is indicated by using the third bit field.

4. The method according to claim 1, wherein the method further comprises:
receiving second signaling from the network device, wherein the second signaling is used to instruct to indicate the power headroom by using the third bit field comprised in the MAC CE.

5. A communications apparatus, comprising:
at least one processor; and
a memory coupled to the at least one processor and having program instructions stored thereon which, when executed by the at least one processor, cause the apparatus to perform operations comprising:
generating a media access control (MAC) control element (CE), wherein the MAC CE is used to indicate a power headroom in a first power headroom set or a power headroom in a second power headroom set, wherein:
when the MAC CE is used to indicate the power headroom in the first power headroom set, the MAC CE comprises a first bit field, a second bit field, and a data volume field, wherein the first bit field is a reserved bit field, wherein the second bit field is used to indicate the power headroom in the first power headroom set, and wherein the data volume field indicates a data volume; and
when the MAC CE is used to indicate the power headroom in the second power headroom set, the MAC CE comprises a third bit field and the data volume field, wherein the third bit field is used to indicate the power headroom in the second power headroom set, and wherein the third bit field comprises a bit of the first bit field and a bit of the second bit field; and
sending the MAC CE to a network device.

6. The apparatus according to claim 5, wherein the MAC CE further comprises a fourth bit field, and wherein:
when the MAC CE is used to indicate the power headroom in the first power headroom set, the fourth bit field is a reserved bit field in the MAC CE; and
when the MAC CE is used to indicate the power headroom in the second power headroom set, the fourth bit field is used to indicate that the power headroom is indicated by using the third bit field.

7. The apparatus according to claim 5, wherein the operations further comprise:
sending first signaling to the network device, wherein the first signaling is used to indicate that the power headroom is indicated by using the third bit field; or
sending the MAC CE to the network device through a common control channel (CCCH), wherein a logical channel identifier of the CCCH is a first identifier, and wherein the first identifier is used to indicate that the power headroom is indicated by using the third bit field.

8. The apparatus according to claim 5, wherein the operations further comprise:
receiving second signaling from the network device, wherein the second signaling is used to instruct to indicate the power headroom by using the third bit field comprised in the MAC CE.

9. A communications apparatus, comprising:
at least one processor; and
a memory coupled to the at least one processor and having program instructions stored thereon which, when executed by the at least one processor, cause the apparatus to perform operations comprising:
obtaining first resource information indicated by a network device, wherein the first resource information is used to send a third message (msg3), and wherein the first resource information comprises a parameter of a modulation and coding scheme of msg3 and a parameter of a quantity of resource units used for msg3; and determining second resource information based on a proper subset of the parameters comprised in the first resource information, wherein the second resource information is used to actually send msg3, wherein a second transport block size is smaller than a first transport block size, wherein the second transport block size is a transport block size, of msg3, comprised in the second resource information, wherein the first transport block size is a transport block size, of msg3, comprised in the first resource information, and wherein the second resource information is determined by:

keeping the modulation and coding scheme of msg3 unchanged and decreasing the quantity of resource units used for msg3; or keeping the quantity of resource units used for msg3 unchanged and reducing the modulation and coding scheme of msg3.

* * * * *